(12) United States Patent
Yang et al.

(10) Patent No.: US 12,265,667 B2
(45) Date of Patent: Apr. 1, 2025

(54) STYLUS-BASED DATA PROCESSING METHOD AND APPARATUS

(71) Applicant: Honor Device Co., Ltd., Shenzhen (CN)

(72) Inventors: Jing Yang, Shenzhen (CN); Yingjun Xi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/043,677

(22) PCT Filed: Aug. 26, 2022

(86) PCT No.: PCT/CN2022/115044
§ 371 (c)(1),
(2) Date: Mar. 1, 2023

(87) PCT Pub. No.: WO2023/035972
PCT Pub. Date: Mar. 16, 2023

(65) Prior Publication Data
US 2024/0353937 A1    Oct. 24, 2024

(30) Foreign Application Priority Data
Sep. 10, 2021   (CN) .......................... 202111063223.9

(51) Int. Cl.
*G06F 3/0354*   (2013.01)
*G06F 3/04842*  (2022.01)
*G06F 3/04883*  (2022.01)

(52) U.S. Cl.
CPC ...... *G06F 3/03545* (2013.01); *G06F 3/04842* (2013.01); *G06F 3/04883* (2013.01); *G06F 2203/0384* (2013.01)

(58) Field of Classification Search
CPC ............. G06F 3/03545; G06F 3/04842; G06F 3/04883; G06F 2203/0384
See application file for complete search history.

(56) References Cited

U.S. PATENT DOCUMENTS

| | | |
|---|---|---|
| 9,285,903 B1 | 3/2016 | Yun et al. |
| 9,459,794 B1 | 10/2016 | Soegiono |
| 10,613,748 B2 | 4/2020 | Alcorn et al. |

(Continued)

FOREIGN PATENT DOCUMENTS

| | | |
|---|---|---|
| CN | 102110138 A | 6/2011 |
| CN | 104471522 A | 3/2015 |

(Continued)

*Primary Examiner* — Benyam Ketema
(74) *Attorney, Agent, or Firm* — Slater Matsil, LLP

(57) ABSTRACT

Embodiments of this application provide a stylus-based data processing method and apparatus, which are applied to a communication system. The communication system includes a stylus and an electronic device. The electronic device displays a first interface. After a user performs a first operation on a first target area in the first interface by using the stylus, the electronic device may determine first target content in the first target area. The stylus may obtain the first target content from the electronic device, and obtain a first target result corresponding to the first target content. The electronic device may obtain the first target result from the stylus and display the first target result on the first interface.

19 Claims, 13 Drawing Sheets

(56) References Cited

U.S. PATENT DOCUMENTS

| | | | |
|---|---|---|---|
| 2003/0107607 A1* | 6/2003 | Nguyen | G06F 3/04883 715/863 |
| 2006/0033725 A1* | 2/2006 | Marggraff | G06F 3/04883 345/179 |
| 2006/0066591 A1* | 3/2006 | Marggraff | G06F 3/03545 382/187 |
| 2006/0067577 A1* | 3/2006 | Marggraff | G06F 3/0482 382/187 |
| 2012/0254227 A1 | 10/2012 | Heck et al. | |
| 2013/0154956 A1* | 6/2013 | Tudosoiu | G06F 3/03545 345/173 |
| 2014/0006920 A1* | 1/2014 | Li | G06F 3/03545 715/230 |
| 2014/0015776 A1 | 1/2014 | Kim et al. | |
| 2014/0125580 A1* | 5/2014 | Eun | H04N 1/00307 345/156 |
| 2014/0201228 A1 | 7/2014 | Long et al. | |
| 2014/0253470 A1* | 9/2014 | Havilio | G06F 3/0488 345/173 |
| 2015/0002484 A1 | 1/2015 | Case et al. | |
| 2015/0103014 A1* | 4/2015 | Kim | G06F 3/04886 345/173 |
| 2016/0147434 A1* | 5/2016 | Lee | G06F 3/0482 715/838 |
| 2017/0131802 A1 | 5/2017 | Yeh et al. | |
| 2017/0344168 A1* | 11/2017 | Tone | G06F 16/13 |
| 2018/0095653 A1* | 4/2018 | Hasek | G06F 3/04883 |
| 2018/0246588 A1 | 8/2018 | Bostick et al. | |
| 2018/0253163 A1 | 9/2018 | Berger et al. | |
| 2019/0004622 A1 | 1/2019 | O'Brien et al. | |
| 2019/0034650 A1 | 1/2019 | Faure et al. | |
| 2019/0065476 A1 | 2/2019 | Kwon et al. | |
| 2019/0369754 A1 | 12/2019 | Roper et al. | |
| 2022/0382448 A1 | 12/2022 | Lu et al. | |
| 2024/0094841 A1 | 3/2024 | Li et al. | |

FOREIGN PATENT DOCUMENTS

| | | | |
|---|---|---|---|
| CN | 104636326 A | | 5/2015 |
| CN | 105141741 A | | 12/2015 |
| CN | 105718930 A | | 6/2016 |
| CN | 107977155 A | | 5/2018 |
| CN | 108052687 A | | 5/2018 |
| CN | 109263362 A | | 1/2019 |
| CN | 110109576 A | | 8/2019 |
| CN | 110245973 A | | 9/2019 |
| CN | 209862616 U | | 12/2019 |
| CN | 110770715 A | | 2/2020 |
| CN | 110781688 A | | 2/2020 |
| CN | 111475627 A | | 7/2020 |
| CN | 112162665 A | | 1/2021 |
| CN | 112579537 A | | 3/2021 |
| CN | 112882643 A | * | 6/2021 |
| CN | 113220204 A | | 8/2021 |
| CN | 113238703 A | | 8/2021 |
| CN | 113970971 A | | 1/2022 |
| WO | 2021052458 A1 | | 3/2021 |

* cited by examiner

STYLUS-BASED DATA PROCESSING METHOD AND APPARATUS

CROSS-REFERENCE TO RELATED APPLICATIONS

This application is a national stage of International Application No. PCT/CN2022/115044, filed on Aug. 26, 2022, which claims priority to Chinese Patent Application No. 202111063223.9, filed on Sep. 10, 2021. The disclosures of both of the aforementioned applications are hereby incorporated by reference in their entireties.

TECHNICAL FIELD

This application relates to the field of terminal technologies, and in particular, to a stylus-based data processing method and apparatus.

BACKGROUND

With development of terminal technologies, electronic devices that support stylus input are developed and applied. When a user reads with an electronic device, the user may perform writing and the like on read content on a touchscreen of the electronic device by using a stylus.

If the user encounters content that the user does not understand in a reading process, the user may open a search application of the electronic device and search for the content that the user does not understand in the search application, so that searched content can help the user understand the content that the user does not understand.

However, when the user encounters a large amount of content that the user does not understand, the user needs to open the search application of the electronic device for a plurality of times. An operation process is cumbersome, and reading efficiency of the user is reduced.

SUMMARY

Embodiments of this application provide a stylus-based data processing method and apparatus, which are applied to a communication system. The communication system includes a stylus and an electronic device. The electronic device displays a first interface. After a user performs a first operation on a first target area in the first interface by using the stylus, the first interface of the electronic device displays a first control. After the electronic device receives a second operation performed on the first control, the electronic device may determine first target content in the first target area. The stylus may obtain the first target content from the electronic device, and obtain, based on information indicated by the first control, a first target result corresponding to the first target content. The electronic device may obtain the first target result from the stylus and display the first target result on the first interface. Therefore, the user does not need to frequently open a search application of the electronic device, the user may obtain a target result corresponding to target content based on the stylus, an operation process is simple, and reading efficiency of the user is improved.

According to a first aspect, an embodiment of this application provides a stylus-based data processing method, applied to a communication system. The communication system includes a stylus and an electronic device. The method includes: The electronic device displays a first interface; the electronic device receives, on the first interface, a first operation performed on a first target area by the stylus, where the first target area is some or all areas in the first interface; the electronic device displays a first control on the first interface in response to the first operation; the electronic device receives a second operation performed on the first control; the electronic device determines first target content in the first target area in response to the second operation; the stylus obtains the first target content from the electronic device; the stylus obtains, based on information indicated by the first control, a first target result corresponding to the first target content; the electronic device obtains the first target result from the stylus; and the electronic device displays the first target result on the first interface. In this way, a user does not need to frequently open a search application of the electronic device, the user may obtain a target result corresponding to target content based on the stylus, an operation process is simple, and reading efficiency of the user is improved.

In a possible implementation, the stylus is provided with an offline database, and that the stylus obtains, based on information indicated by the first control, a first target result corresponding to the first target content includes: The stylus calls the offline database, where the offline database stores a plurality of correspondences, and any one of the correspondences is used to indicate a relationship between target content and a target result; and when the stylus finds that the first target content matches any target content in the plurality of correspondences, the stylus obtains, from a correspondence in which the any target content is located, the first target result corresponding to the first target content. In this way, the stylus may obtain, by using the offline database, the first target result corresponding to the first target content, so that efficiency of seeing the first target result in the electronic device by the user can be improved.

In a possible implementation, the method further includes: When the stylus does not match the first target content in the plurality of correspondences, the stylus calls a cloud database; and the stylus queries the cloud database for a result corresponding to the first target content, to obtain the first target result. In this way, when the stylus does not find the first target content by using the offline database, the stylus may further use the cloud database to obtain the first target result corresponding to the first target content, so that the user can obtain the first target result, to meet a requirement that the user can see the first target result in the electronic device.

In a possible implementation, that the stylus calls a cloud database includes: When the electronic device is connected to a first network, the stylus calls the cloud database through the first network. In this way, the stylus may call the cloud database based on a wireless connection between the stylus and the electronic device, to obtain the first target result.

In a possible implementation, that the stylus calls a cloud database includes: The stylus is connected to a first hotspot; and the stylus calls the cloud database through a network of the first hotspot. In this way, when the stylus has a network, the stylus may call the cloud database to obtain the first target result, thereby improving efficiency of obtaining the first target result by the stylus by using the cloud database.

In a possible implementation, that the stylus calls a cloud database includes: The stylus is connected to a second network; and the stylus calls the cloud database through the second network. In this way, when the stylus has a network, the stylus may call the cloud database to obtain the first target result, thereby improving efficiency of obtaining the first target result by the stylus by using the cloud database.

In a possible implementation, when the first target content is text content, the information indicated by the first control is information indicating that the text content needs to be translated into a first language, and the first target result is a result indicating that the text content has been translated into the first language.

In a possible implementation, when the first target content is a question, the information indicated by the first control is information indicating that the question needs to be answered, and the first target result is a process of answering the question.

In a possible implementation, that the stylus obtains the first target content from the electronic device includes: The stylus receives first encapsulation content from the electronic device, where the first encapsulation content is content obtained after the electronic device encapsulates the first target content; and the stylus parses the first encapsulation content, to obtain the first target content. In this way, the electronic device may transmit the first encapsulation content to the stylus. After parsing the first encapsulation content, the stylus may process the first target content, so that the stylus can obtain the first target result after processing the first target content.

In a possible implementation, that the electronic device obtains the first target result from the stylus includes: The electronic device receives second encapsulation content from the stylus, where the second encapsulation content is content obtained after the stylus encapsulates the first target result; and the electronic device parses the second encapsulation content, to obtain the first target result. In this way, the stylus may transmit the second encapsulation content to the electronic device. After parsing the second encapsulation content, the electronic device may obtain the first target result, so that the electronic device may display the first target result on the first interface, to meet a requirement that the user can see the first target result in the electronic device without opening the search application of the electronic device.

In a possible implementation, that the electronic device determines first target content in the first target area in response to the second operation includes: The electronic device obtains a first picture corresponding to the first target area; and the electronic device extracts content in the first picture, to obtain the first target content. In this way, the electronic device may obtain the first target content, so that the stylus may obtain the first target content from the electronic device.

In a possible implementation, the method further includes: The electronic device receives, on a second interface, a third operation performed on a second target area by the stylus, where the second target area is some or all areas in the second interface; the electronic device displays a second control on the second interface in response to the third operation; the electronic device receives a fourth operation performed on the second control; the electronic device displays a third control on the second interface in response to the fourth operation, where the third control is configured to view target content and a target result in a first period of time; the electronic device receives a fifth operation performed on the third control; and the electronic device displays the target content and the target result in the first period of time on the second interface in response to the fifth operation. In this way, the target content and the target result that are previously obtained based on the stylus may be displayed on the second interface of the electronic device, thereby facilitating the user to search for target content and a target result that the user wants to see.

According to a second aspect, an embodiment of this application provides a stylus-based data processing apparatus, applied to a communication system. The communication system includes a stylus and an electronic device. The apparatus includes a display unit, a processing unit, and an obtaining unit. The display unit is configured to display a first interface; the processing unit is configured to receive, on the first interface, a first operation performed on a first target area by the stylus, where the first target area is some or all areas in the first interface; the display unit is further configured display a first control on the first interface in response to the first operation; the processing unit is further configured to receive a second operation performed on the first control; the processing unit is further configured to determine first target content in the first target area in response to the second operation; the obtaining unit is configured to obtain the first target content from the electronic device; the processing unit is configured to obtain, based on information indicated by the first control, a first target result corresponding to the first target content; the obtaining unit is further configured to obtain the first target result from the stylus; and the display unit is further configured to display the first target result on the first interface.

In a possible implementation, the stylus is provided with an offline database. The processing unit is specifically configured to: call the offline database, where the offline database stores a plurality of correspondences, and any one of the correspondences is used to indicate a relationship between target content and a target result; and when the stylus finds that the first target content matches any target content in the plurality of correspondences, obtain, from a correspondence in which the any target content is located, the first target result corresponding to the first target content.

In a possible implementation, the processing unit is further specifically configured to: when the stylus does not match the first target content in the plurality of correspondences, call a cloud database; and query the cloud database for a result corresponding to the first target content, to obtain the first target result.

In a possible implementation, the processing unit is specifically configured to: when the electronic device is connected to a first network, call the cloud database through the first network.

In a possible implementation, the processing unit is specifically configured to: connect to a first hotspot; and call the cloud database through a network of the first hotspot.

In a possible implementation, the processing unit is specifically configured to: connect to a second network; and call the cloud database through the second network.

In a possible implementation, when the first target content is text content, the information indicated by the first control is information indicating that the text content needs to be translated into a first language, and the first target result is a result indicating that the text content has been translated into the first language.

In a possible implementation, when the first target content is a question, the information indicated by the first control is information indicating that the question needs to be answered, and the first target result is a process of answering the question.

In a possible implementation, the obtaining unit is specifically configured to: receive first encapsulation content from the electronic device, where the first encapsulation content is content obtained after the electronic device encapsulates the first target content; and parse the first encapsulation content, to obtain the first target content.

In a possible implementation, the obtaining unit is specifically configured to: receive a second encapsulation content from the stylus, where the second encapsulation content is content obtained after the stylus encapsulates the first target result; and parse the second encapsulation content, to obtain the first target result.

In a possible implementation, the processing unit is specifically configured to: obtain a first picture corresponding to the first target area; and extract content in the first picture, to obtain the first target content.

In a possible implementation, the processing unit is further configured to receive, on a second interface, a third operation performed on a second target area by the stylus, where the second target area is some or all areas in the second interface; the display unit is further configured to display a second control on the second interface in response to the third operation; the processing unit is further configured to receive a fourth operation performed on the second control; the display unit is further configured to display a third control on the second interface in response to the fourth operation, where the third control is configured to view target content and a target result in a first period of time; the processing unit is further configured to receive a fifth operation performed on the third control; and the display unit is further configured to display the target content and the target result in the first period of time on the second interface in response to the fifth operation.

According to a third aspect, an embodiment of this application provides a stylus-based data processing apparatus, including a processor and a memory. The memory is configured to store code instructions, and the processor is configured to execute the code instructions to perform the method described in any one of the first aspect or the possible implementations of the first aspect.

According to a fourth aspect, an embodiment of this application provides a computer-readable storage medium. The computer-readable storage medium stores a computer program or instructions. When the computer program or the instructions are run on a computer, the computer is enabled to perform the method described in any one of the first aspect or the possible implementations of the first aspect.

According to a fifth aspect, an embodiment of this application provides a computer program product including a computer program. When the computer program is run on a computer, the computer is enabled to perform the method described in any one of the first aspect or the possible implementations of the first aspect.

According to a sixth aspect, an embodiment of this application provides a stylus-based data processing system. The system includes the apparatus described in the second aspect and the various possible implementations of the second aspect.

According to a seventh aspect, this application provides a chip or a chip system. The chip or the chip system includes at least one processor and a communication interface. The communication interface and the at least one processor are interconnected by using a line. The at least one processor is configured to run a computer program or instructions, to perform the method described in any one of the first aspect or the possible implementations of the first aspect, where the communication interface in the chip may be an input/output interface, a pin, a circuit, or the like.

In a possible implementation, the chip or chip system described above in this application further includes at least one memory, and the at least one memory stores instructions. The memory may be a storage unit inside the chip, for example, a register or a cache, or may be a storage unit of the chip (for example, a read-only memory or a random access memory).

It should be understood that the second aspect to the seventh aspect of this application correspond to technical solutions of the first aspect of this application, and beneficial effects obtained in the aspects and corresponding feasible implementations are similar, and are not described again.

DETAILED DESCRIPTION OF ILLUSTRATIVE EMBODIMENTS

For ease of clearly describing technical solutions in embodiments of this application, in the embodiments of this application, the words such as "first" and "second" are used to distinguish between same or similar items with basically the same functions and roles. For example, a first chip and a second chip are merely intended to distinguish between different chips, and a sequence of the first chip and the second chip is not limited. A person skilled in the art may understand that the words such as "first" and "second" do not limit a quantity and an execution sequence, and the words such as "first" and "second" do not indicate a definite difference.

It should be noted that in embodiments of this application, a word such as "exemplarily" or "for example" is used to represent an example, an illustration, or a description. Any embodiment or design solution described as "exemplarily" or "for example" in this application should not be construed as more preferred or advantageous than other embodiments or design solutions. Exactly, use of the word such as "exemplarily" or "for example" is intended to present related concepts in a specific manner.

In embodiments of this application, "at least one" means one or more, and "a plurality of" means two or more. The term "and/or" is used to describe an association relationship between associated objects, and represents that three relationships may exist. For example, A and/or B may represent the following three cases: Only A exists, both A and B exist, and only B exists, where A and B may be singular or plural. The character "/" usually indicates an "or" relationship between the associated objects. "at least one of the following items (pieces)" or a similar expression thereof refers to any combination of these items, including a singular item (piece) or any combination of plural items (pieces). For example, at least one item (piece) of a, b, or c may represent a, b, c, a and b, a and c, b and c, or a, b, and c, where a, b, and c may be singular or plural.

Figure 1:
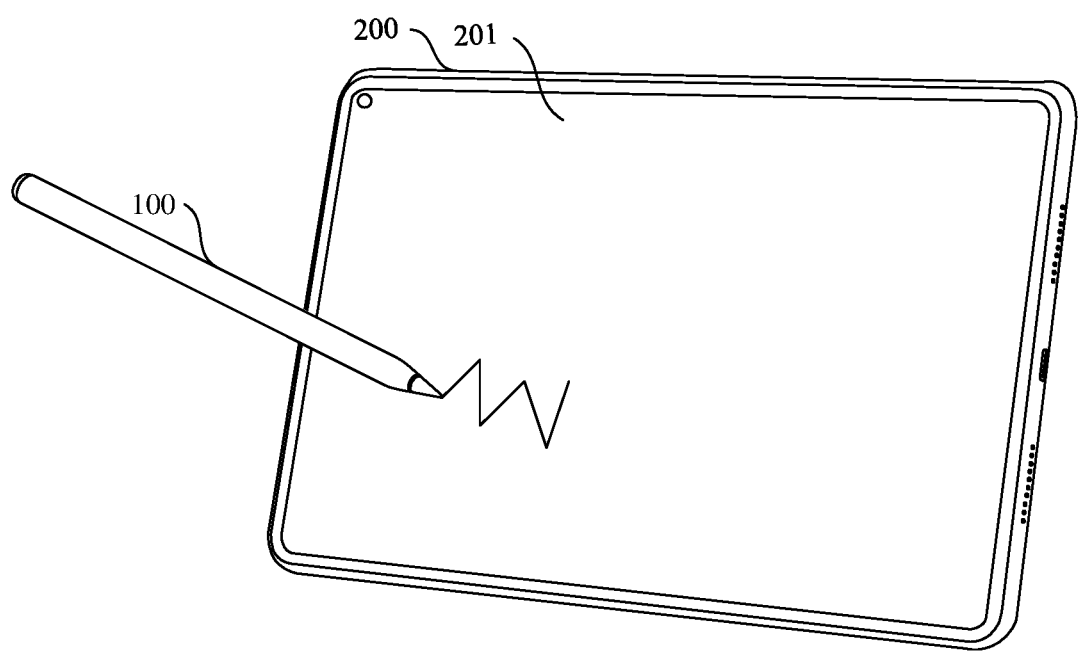
FIG. 1 is a schematic diagram of a scenario according to an embodiment of this application.

FIG. 1 is a schematic diagram of a scenario according to an embodiment of this application. The scenario includes a stylus 100 and an electronic device 200. In FIG. 1, that the electronic device 200 is a tablet is used as an example for description. The stylus 100 may provide an input to the electronic device 200. The electronic device 200 may perform, based on the input of the stylus 100, an operation responding to the input. In some embodiments, the stylus 100 and the electronic device 200 may be interconnected through a communication network, to implement wireless signal interaction. For example, the communication network may be but is not limited to a short-range communication network, for example, a wireless-fidelity (wireless-fidelity, Wi-Fi) hotspot network, a Wi-Fi peer-to-peer (peer-to-peer, P2P) network, a Bluetooth network, a ZigBee (zigbee) network, or a near field communication (near field communication, NFC) network.

The stylus 100 may include a passive stylus and an active stylus. The passive stylus may be referred to as a passivation type stylus, and the active stylus may be referred to as an activation type stylus.

The electronic device 200 has a touchscreen 201. When the stylus 100 is an active stylus, an electrode array needs to be integrated on the touchscreen 201 of the electronic device 200 that interacts with the stylus 100. In some embodiments, the electrode array may be a capacitive electrode array. In this way, the electronic device 200 may receive a signal from the active stylus through the capacitive electrode array, and further, when receiving the signal, identify, based on a change of a capacitance value on the touchscreen 201, a position of the active stylus on the touchscreen and an angle of inclination of the active stylus. Further, the electronic device 200 may display a remark of read content on the touchscreen 201 of the electronic device 200 based on the identified position of the active stylus on the touchscreen and the identified angle of inclination of the active stylus.

Figure 2:
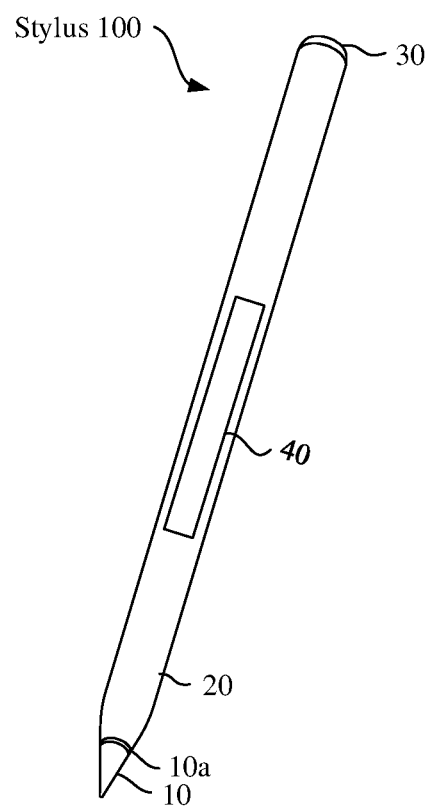
FIG. 2 is a schematic diagram of a structure of a stylus according to an embodiment of this application.

FIG. 2 is a schematic diagram of a structure of a stylus according to an embodiment of this application. As shown in FIG. 2, the stylus 100 may include a tip 10, a holder 20, and a rear cover 30. The interior of the holder 20 is hollow, the tip 10 and the rear cover 30 are respectively located at two ends of the holder 20, and the rear cover 30 and the holder 20 may be connected in a plugging or buckling manner. The interior of the holder 20 may include a battery module 40, and the battery module 40 is configured to provide power for the stylus 100.

In a possible implementation, the battery module 40 may include a lithium-ion battery, or the battery module 40 may include a nickel-chromium battery, an alkaline battery, a nickel-hydrogen battery, or the like. In some embodiments, the battery included in the battery module 40 may be a rechargeable battery or a disposable battery. When the battery included in the battery module 40 is a rechargeable battery, the stylus 100 may charge the battery in the battery module 40 in a wireless charging manner.

Figure 3:
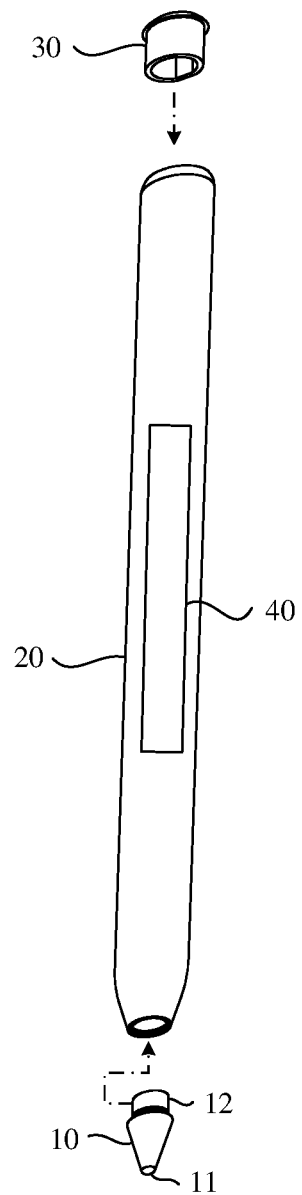
FIG. 3 is a schematic diagram of a partial split structure of a stylus according to an embodiment of this application.

With reference to FIG. 2, exemplarily, FIG. 3 is a schematic diagram of a partial split structure of the stylus according to an embodiment of this application. As shown in FIG. 3, the tip 10 includes a write end 11 and a connection end 12, and the holder 20 includes the battery module 40. The write end 11 is configured to contact the touchscreen 201 of the electronic device 200, so that the electronic device 200 may perform, based on an input of the write end 11, an operation responding to the input, and then a remark and the like of read content may be displayed on the touchscreen 201 of the electronic device 200. The connection end 12 is configured to connect the tip 10 and the holder 20.

In a possible implementation, because there is a gap 10a between the tip 10 and the holder 20, when an external force is imposed on the write end 11 of the tip 10, it can be ensured that the tip 10 can be moved toward the holder 20, so that a user controls the holder 20, to enable the tip 10 to draw graphs of an object in different directions on the touchscreen 201 of the electronic device 200.

Figure 4:
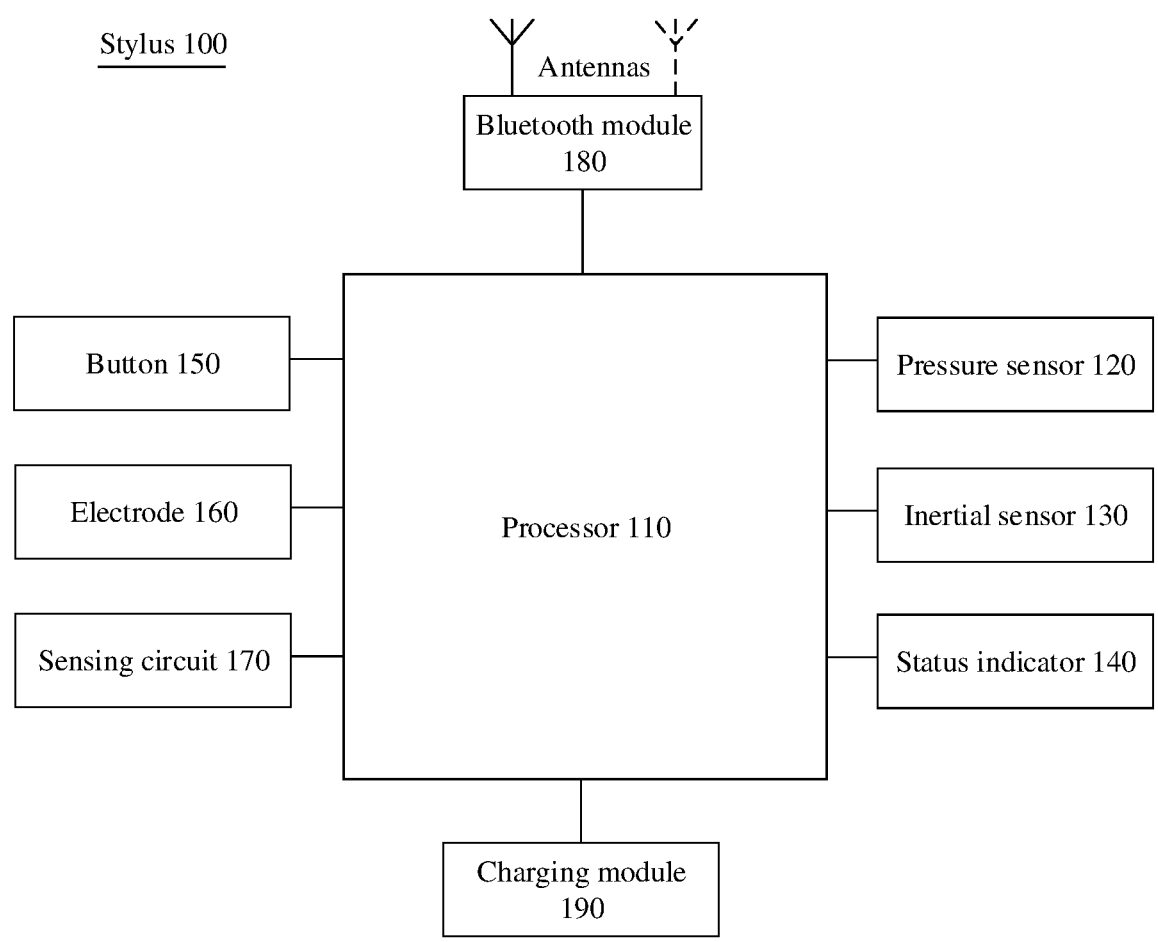
FIG. 4 is a schematic diagram of a hardware structure of a stylus according to an embodiment of this application.

With reference to the content shown in FIG. 1 to FIG. 3, exemplarily, FIG. 4 is a schematic diagram of a hardware structure of the stylus according to an embodiment of this application. As shown in FIG. 4, the stylus 100 may have a processor 110. The processor 110 may include a storage and a processing circuit that are configured to support an operation of the stylus 100. The storage and the processing circuit may include a storage apparatus, for example, a non-volatile memory (for example, a flash memory or another electrically programmable read-only memory constructed as a solid state drive) or a volatile memory (for example, a static or dynamic random access memory). The processing circuit in the processor 110 may be configured to control the operation of the stylus 100. The processing circuit may be based on one or more microprocessors, microcontrollers, digital signal processors, baseband processors, power supply management units, audio chips, application-specific integrated circuits, and the like.

The processor 110 may be configured to run software, on the stylus 100, for controlling the operation of the stylus 100. In an operation process of the stylus 100, the software running on the processor 110 may process a sensor input, a button input, and an input from another apparatus, to monitor a movement of the stylus 100 and another user input. The software running on the processor 110 may detect a user command and may communicate with the electronic device 200.

In a possible implementation, the stylus 100 may include a pressure sensor 120. The pressure sensor 120 may be disposed at the write end 11 (as shown in FIG. 3) of the stylus 100, or the pressure sensor 120 may be disposed in the holder 20 of the stylus 100. In this way, after a force is applied to one end of the tip 10 of the stylus 100, the other end of the tip 10 moves to apply the force to the pressure sensor 120. In some embodiments, the processor 110 may adjust, based on a pressure value detected by the pressure sensor 120, line thickness during writing with the tip 10 of the stylus 100.

In a possible implementation, the sensor may also include an inertial sensor 130. The inertial sensor 130 may include a tri-axis accelerometer, a tri-axis gyroscope, and/or another component configured to measure a movement of the stylus 100. For example, the tri-axis magnetometer may be included in the sensor in a structure of a nine-axis inertial sensor. The sensor may also include an additional sensor, for example, a temperature sensor, an ambient light sensor, a contact sensor, a magnetic sensor, a pressure sensor, and/or another sensor.

In a possible implementation, the stylus 100 may include a status indicator 140 and a button 150. The status indicator 140 is configured to prompt the user about a status of the stylus 100. The button 150 may include a mechanical button and a non-mechanical button.

In a possible implementation, the stylus 100 may include one or more electrodes 160. In this way, the stylus 100 may transmit a signal by using the electrode 160. Because an electrode array is integrated on the touchscreen 201 of the electronic device 200 that interacts with the stylus 100, the electronic device 200 may receive a signal from the stylus 100 through the electrode array. Further, the electronic device 200 may identify, based on a change of a capacitance value on the touchscreen 201, a position of the stylus 100 on the touchscreen and an angle of inclination of the stylus 100. In some embodiments, the electrode 160 may be located at the write end 11 of the stylus 100.

In a possible implementation, the stylus 100 may include a sensing circuit 170, and the sensing circuit 170 may sense capacitive coupling between drive wires of a capacitive touch sensor panel that is of the electrode 160 and that interacts with the stylus 100. For example, the sensing circuit 170 may include an amplifier configured to receive a capacitance reading from the capacitive touch sensor panel, a clock configured to generate a demodulation signal, a phase shifter configured to generate a phase shift demodulation signal, a frequency mixer configured to demodulate the capacitance reading by using an in-phase demodulation frequency component, a frequency mixer configured to demodulate the capacitance reading by using an orthogonal demodulation frequency component, and the like. A demodulation result of a frequency mixer may be used to determine an amplitude proportional to capacitance, so that the stylus 100 can sense contact with the capacitive touch sensor panel.

In a possible implementation, the stylus 100 may further include a charging module 190, and the charging module 190 may support charging of the stylus 100, to provide power for the stylus 100.

It may be understood that, according to an actual requirement, the stylus 100 may include a microphone, a loudspeaker, an audio generator, a vibrator, a camera, a data port, and another device. The user may use these devices to provide commands to control the stylus 100 and an operation of the electronic device 200 that interacts with the stylus 100, and receive status information and another output.

To support wireless communication between the stylus 100 and the electronic device 200, the stylus 100 may include a wireless module, and the wireless module may further be a Wi-Fi hotspot module, a Wi-Fi peer-to-peer module, or the like. In FIG. 4, that the wireless module is a Bluetooth module 180 is used as an example for description. In this embodiment of this application, the Bluetooth module 180 may be referred to as a second Bluetooth module, and the second Bluetooth module is used by the stylus to implement wireless transmission of data between the stylus and the electronic device. For example, the stylus may receive first encapsulation content from the electronic device through the second Bluetooth module, or the stylus may send second encapsulation content to the electronic device through the second Bluetooth module.

The Bluetooth module 180 may include a radio frequency transceiver, for example, a transceiver. The Bluetooth module 180 may also include one or more antennas. The transceiver may transmit and/or receive a wireless signal by using an antenna. The wireless signal may be a Bluetooth signal, a wireless local area network signal, a remote signal such as a cellular phone signal, a near field communication signal, or another wireless signal based on a type of the wireless module.

It may be understood that the electronic device 200 in this embodiment of this application may be referred to as user equipment (user equipment, UE), a terminal (terminal), or the like. The electronic device 200 may be a mobile terminal or fixed terminal with a touchscreen, for example, a portable android device (portable android device, PAD), a personal digital assistant (personal digital assistant, PDA), a handheld device, computing device, vehicle-mounted device, or wearable device with a wireless communication function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the electronic device is not specifically limited in this embodiment of this application.

Figure 5:
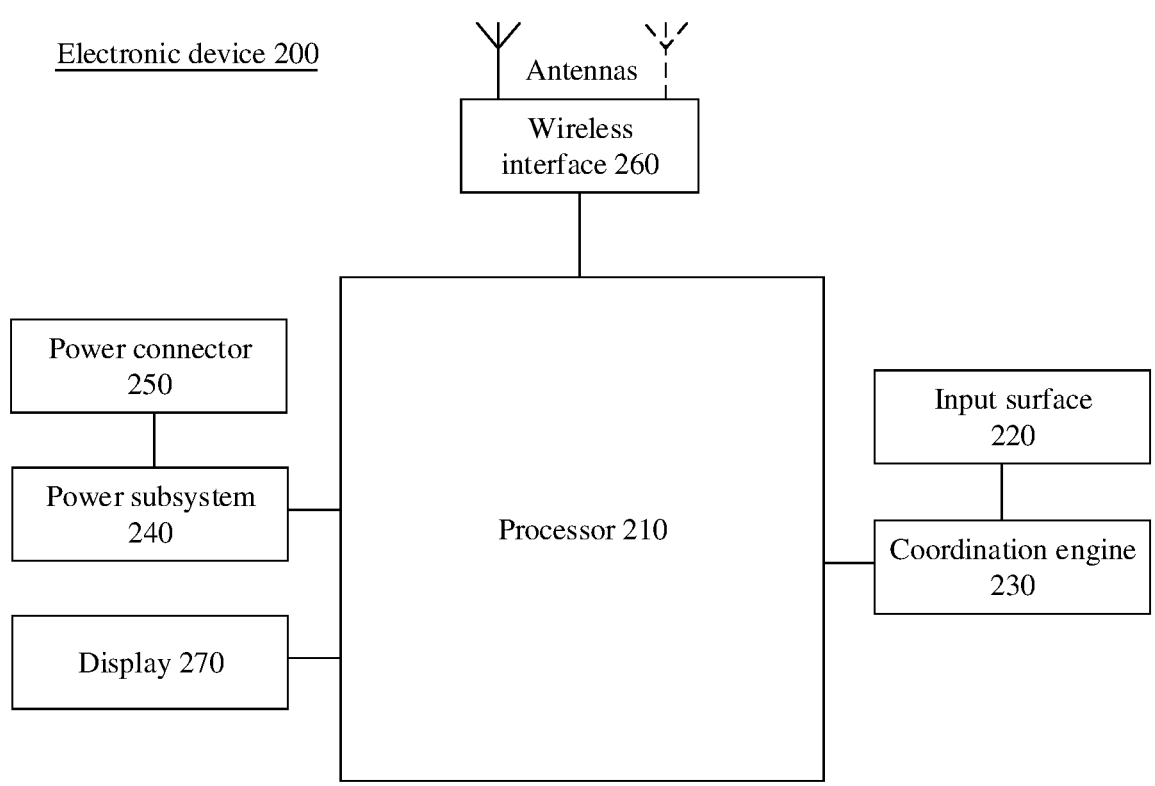
FIG. 5 is a schematic diagram of a hardware structure of an electronic device according to an embodiment of this application.

Exemplarily, FIG. 5 is a schematic diagram of a hardware structure of an electronic device according to an embodiment of this application. As shown in FIG. 5, the electronic device 200 may include a plurality of subsystems that cooperate to perform, coordinate, or monitor one or more operations or functions of the electronic device 200. The electronic device 200 includes a processor 210, an input surface 220, a coordination engine 230, a power subsystem 240, a power connector 250, a wireless interface 260, and a display 270.

In a possible implementation, the processor 210 may be configured to perform, coordinate, and/or manage a function of the electronic device 200. Such a function may include but is not limited to: communicating and/or exchanging data with another subsystem of the electronic device 200, communicating and/or exchanging data with the stylus 100, performing data communication and/or exchanging data through a wireless interface, performing data communication and/or exchanging data through a wired interface, facilitating power switching through a wireless (for example, inductive or resonant) or wired interface, and receiving one or more positions and angular positions of the stylus.

In some embodiments, the processor 210 may be implemented as any electronic device capable of processing, receiving or sending data or instructions. For example, the processor may be a microprocessor, a central processing unit, an application-specific integrated circuit, a field programmable gate array, a digital signal processor, an analog circuit, a digital circuit, or a combination of these devices; the processor may be a single-thread or multi-thread processor; or the processor may be a single-core or multi-core processor.

In some other embodiments, the processor 210 may be configured to access a memory that stores instructions, where the instructions may be configured to enable the processor to perform, coordinate, or monitor one or more operations or functions of the electronic device 200. Alternatively, the instructions may be configured to control or coordinate an operation of another component of the electronic device 200, where the component is but is not limited to: another processor, an analog or digital circuit, a volatile or non-volatile memory module, a display, a loudspeaker, a microphone, a rotary input device, a button or another physical input device, a biometric authentication sensor and/or system, a force or touch input/output component, a communication module (for example, a wireless interface and/or a power connector), and/or a tactile or tactile feedback device.

In a possible implementation, the coordination engine 230 may be configured to: communicate with another subsystem of the electronic device 200 and/or process data; communicate with the stylus 100 and/or exchange data; measure and/or obtain an output of one or more analog or digital sensors (such as a touch sensor); measure and/or obtain an output of one or more sensor nodes of a sensor node array (for example, an array of capacitive sensing nodes); receive and position a tip signal and a ring signal from the stylus 100; and position the stylus 100 and the like based on a position of the tip signal cross region and a position of the ring signal cross region.

The coordination engine 230 includes or is otherwise communicatively coupled to a sensor layer that is located below the input surface 220 or that is integrated with the input surface 220. In this way, the coordination engine 230 may position the stylus 100 on the input surface 220 by using the sensor layer, for example, the coordination engine 230 may detect the presence of the tip 10 of the stylus 100 and/or a finger touch of the user by monitoring a capacitance (for example, mutual capacitance or self-capacitance) change presented at each capacitive sensing node. In some embodiments, the input surface 220 may be referred to as a touchscreen 201.

In a possible implementation, the electronic device 200 further includes the power subsystem 240. The power subsystem 240 may include a battery or another power supply. The power subsystem 240 may be configured to provide power to the electronic device 200. The power subsystem 240 may also be coupled to the power connector 250. The power connector 250 may be any suitable connector or port configured to receive power from an external power supply and/or configured to provide power to an external load. For example, in some embodiments, the power connector 250 may be configured to recharge the battery in the power subsystem 240. In some other embodiments, the power connector 250 may be configured to transmit power that is stored in (or that may be used by) the power subsystem 240 to the stylus 100.

In a possible implementation, the electronic device 200 further includes the wireless interface 260, so that the electronic device 200 may perform electronic communication with the stylus 100. In some embodiments, the electronic device 200 may be configured to communicate with the stylus 100 through a low-energy Bluetooth communication interface or a near field communication interface. In another example, a communication interface facilitates electronic communication between the electronic device 200 and an external communication network, a device, or a platform.

Regardless of a communication interface between the electronic device 200 and the stylus 100 or another communication interface, the wireless interface 260 may be implemented as one or more wireless interfaces, Bluetooth interfaces, near field communication interfaces, magnetic interfaces, universal serial bus interfaces, inductive interfaces, resonant interfaces, capacitive coupling interfaces, Wi-Fi interfaces, TCP/IP interfaces, network communication interfaces, optical interfaces, acoustic interfaces, any conventional communication interface, or the like.

In a possible implementation, the electronic device 200 further includes the display 270. The display 270 may be located behind the input surface 220, or the display 270 may be integrated with the input surface 220. The display 270 may be coupled to the processor 210, the processor 210 may present information to the user by using the display 270, and the processor 210 may use the display 270 to present an interface with which the user may interact. Further, the user controls the stylus 100 to interact with the interface.

In this embodiment of this application, the display 270 may be understood as a display module, and the display module is configured to display a first interface. The electronic device 200 may further include a first encapsulation module. The first encapsulation module is configured to encapsulate first target content by the electronic device, so that the encapsulated first target content may be sent to the stylus through a first Bluetooth module. The electronic device 200 may further include the first Bluetooth module, and the first Bluetooth module is used by the electronic device to implement wireless transmission of data between the electronic device and the stylus. For example, the electronic device may send first encapsulation content to the stylus through the first Bluetooth module, or the electronic device may receive second encapsulation content from the stylus through the first Bluetooth module. The electronic device 200 further includes a first parsing module, and the first parsing module is configured to parse the second encapsulation content, so that the electronic device can obtain a first target result, and present the first target result to the user by using the display 270. FIG. 5 does not show the first encapsulation module, the first Bluetooth module, and the first parsing module.

The first Bluetooth module is used by the electronic device to implement wireless transmission of data between the electronic device and the stylus, and a second Bluetooth module is used by the stylus to implement wireless transmission of data between the stylus and the electronic device. Therefore, it may be understood that the stylus and the electronic device establish wireless connections through respective Bluetooth modules.

It should be noted that FIG. 5 is only an example of the electronic device 200, and the electronic device 200 may include more subsystems, modules, components, and the like. This is not limited in this embodiment of this application.

In an application of the stylus and the electronic device, the user may use the stylus to perform writing on read content on the touchscreen of the electronic device.

If the user encounters content that the user does not understand in a reading process, the user may open a search application of the electronic device and search for the content that the user does not understand in the search application, so that searched content can help the user understand the content that the user does not understand.

However, when the user encounters a large amount of content that the user does not understand, the user needs to open the search application of the electronic device for a plurality of times. An operation process is cumbersome, and reading efficiency of the user is reduced.

In view of this, embodiments of this application provide a stylus-based data processing method and apparatus, which are applied to a communication system. The communication system includes a stylus and an electronic device. The electronic device displays a first interface. After a user performs a first operation on a first target area in the first interface by using the stylus, the first interface of the electronic device displays a first control. After the electronic device receives a second operation performed on the first control, the electronic device may determine first target content in the first target area. The stylus may obtain the first target content from the electronic device, and obtain, based on information indicated by the first control, a first target result corresponding to the first target content. The electronic device may obtain the first target result from the stylus and display the first target result on the first interface. Therefore, the user does not need to frequently open a search application of the electronic device, the user may obtain a target result corresponding to target content based on the stylus, an operation process is simple, and reading efficiency of the user is improved.

Figure 6:
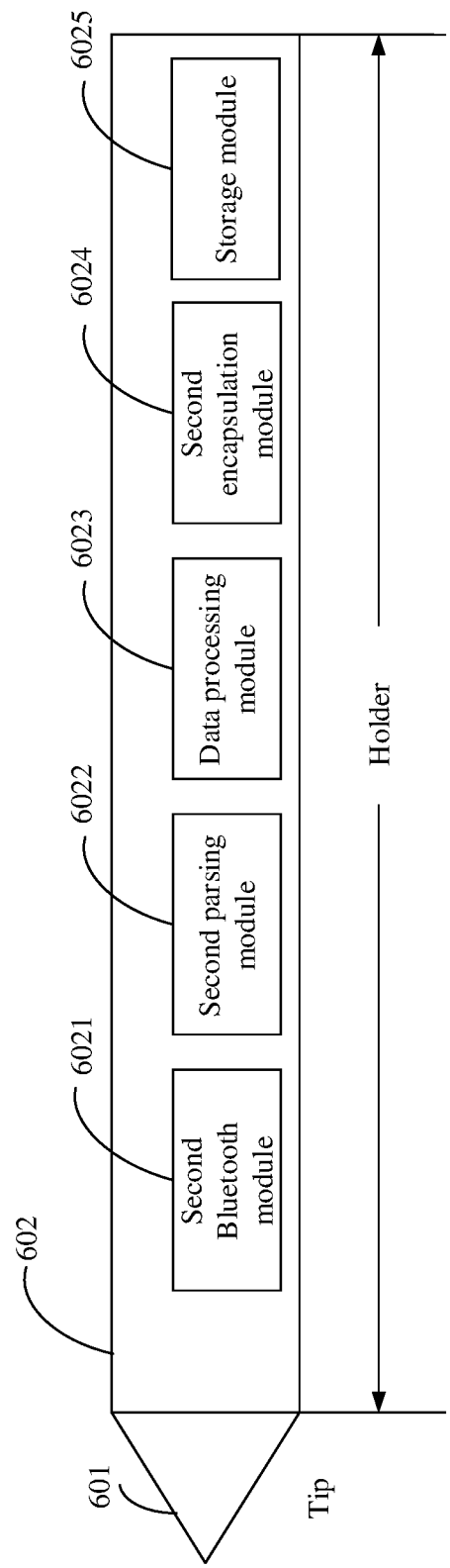
FIG. 6 is a schematic diagram of a structure of a stylus according to an embodiment of this application.

Exemplarily, FIG. 6 is a schematic diagram of a structure of a stylus according to an embodiment of this application. As shown in FIG. 6, the stylus may include a tip 601 and a holder 602. The interior of the holder 602 includes a second Bluetooth module 6021, a second parsing module 6022, a data processing module 6023, a second encapsulation module 6024, and a storage module 6025.

In a possible implementation, the second Bluetooth module 6021 is used by the stylus to implement wireless transmission of data between the stylus and an electronic device. For example, the stylus may send second encapsulation content to the electronic device through the second Bluetooth module, or the stylus may receive first encapsulation content from the electronic device through the second Bluetooth module. The second parsing module 6022 is configured to parse the first encapsulation content from the electronic device, so that the stylus can obtain first target content. The data processing module 6023 is configured to obtain a first target result corresponding to the first target content. The storage module 6025 is configured to store the first target content and the first target result.

Figure 7:
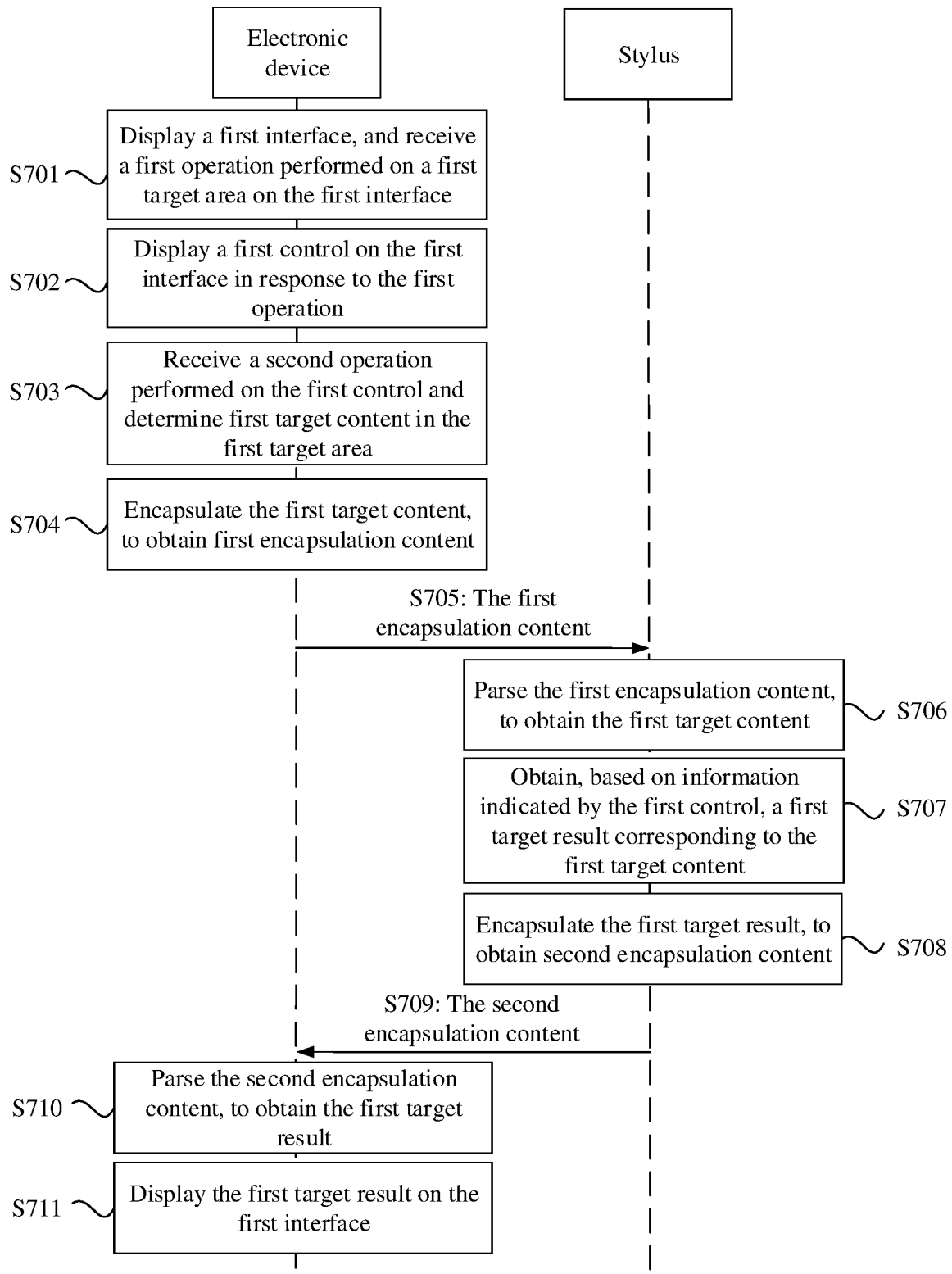
FIG. 7 is a schematic flowchart of a stylus-based data processing method according to an embodiment of this application.

With reference to the content shown in FIG. 1 to FIG. 6, exemplarily, FIG. 7 is a schematic flowchart of a stylus-based data processing method according to an embodiment of this application. As shown in FIG. 7, the method may include the following steps:

S701: An electronic device displays a first interface, and receives a first operation performed on a first target area on the first interface.

In this embodiment of this application, the electronic device may display the first interface through a display module, the first interface is an interface on which a user reads content on the electronic device, the first interface includes the first target area, and the first target area is some or all areas in the first interface.

Figure 8:
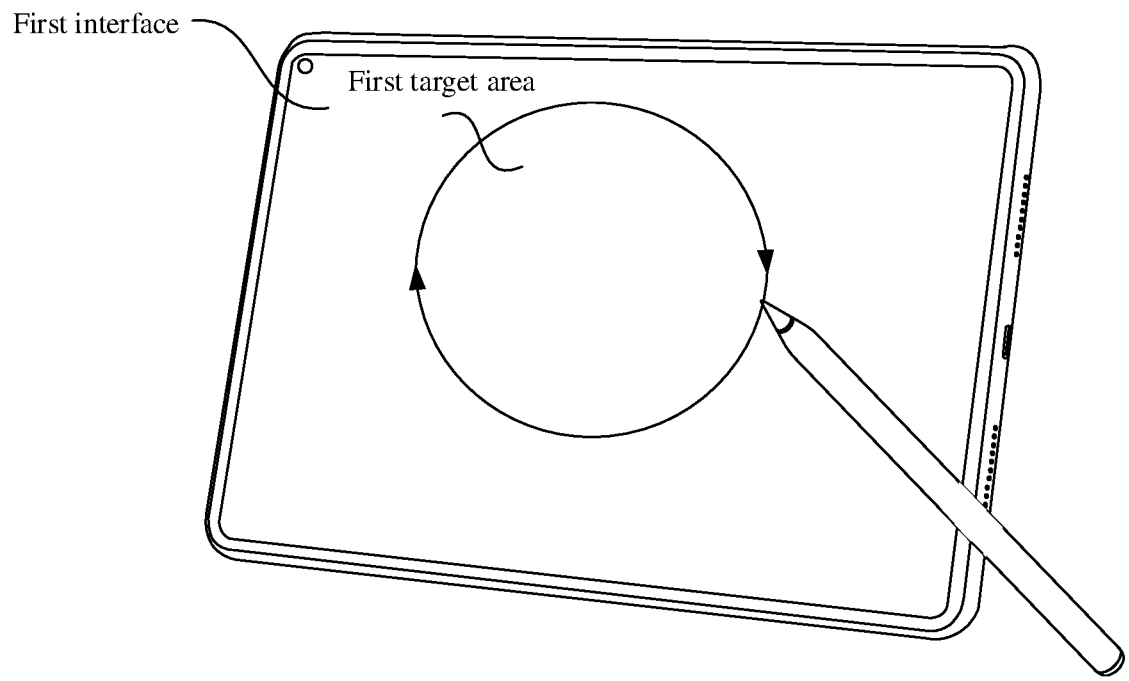
FIG. 8 is a schematic diagram of a first operation according to an embodiment of this application.

In this embodiment of this application, the first operation is an operation performed by the user by using a stylus to circle the first target area. Exemplarily, FIG. 8 is a schematic diagram of the first operation provided in this embodiment of this application. After the electronic device displays the first interface, the user may use the stylus to circle the first target area in a clockwise direction, so that the circled first target area is displayed on the first interface. The direction in which the user circles the first target area by using the stylus may be determined based on a personal habit of the user and is not limited in this embodiment of this application. A shape of the circled first target area may be an ellipse shown in FIG. 8, or may be a rectangle. This is not limited in this embodiment of this application.

S702: The electronic device displays a first control on the first interface in response to the first operation.

Figure 9:
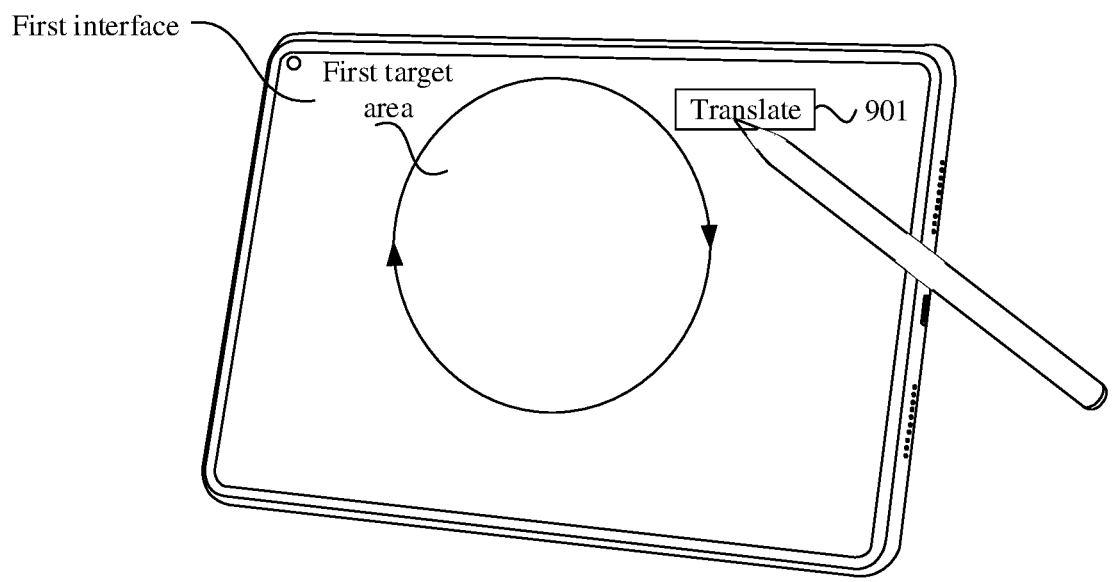
FIG. 9 is a schematic diagram of a first control according to an embodiment of this application.

In this embodiment of this application, with reference to FIG. 8, exemplarily, FIG. 9 is a schematic diagram of the first control provided in this embodiment of this application. As shown in FIG. 9, after the user circles the first target area in the first interface by using the stylus, an attachment of the electronic device in the first target area displays the first control, where the first control is translate 901. After the user clicks translate 901 by using the stylus, translation of first target content in the first target area may be implemented based on a translation function of the stylus. A specific implementation process is described later, and details are not described herein again.

S703: The electronic device receives a second operation performed on the first control and determines the first target content in the first target area.

In this embodiment of this application, with reference to FIG. 9, the first control is translate 901. Therefore, the second operation may be understood as an operation of clicking translate 901 by the user by using the stylus, or may be understood as an operation of triggering translate 901 by the user through an operation, for example, a click or a touch. In this way, after receiving the second operation, the electronic device may determine the first target content in the first target area.

In this embodiment of this application, the first target content may be understood as content that the user does not understand in a reading process, or the first target content may be understood as to-be-translated content. For example, the first target content may include a word and a sentence, and the word or sentence may be an English word or an English sentence.

It may be understood that specific content of the first target content may be set based on an actual application scenario. This is not limited in this embodiment of this application.

With reference to the content described in S701 and S702, it may be understood that because an electrode array is integrated on a touchscreen of the electronic device, the electronic device may receive a signal from the stylus through the electrode array. The electronic device analyzes a change of a capacitance value corresponding to the signal, to identify, based on the change of the capacitance value, the first target area formed by the stylus sliding on the first interface. Further, a possible implementation in which the electronic device displays the first control on the first interface, and the electronic device receives the second operation performed on the first control and determines the first target content in the first target area is as follows: The electronic device obtains a first picture corresponding to the first target area, preprocesses the first picture, and performs feature extraction and feature dimension reduction on a preprocessed picture.

Further, the electronic device obtains, based on a dimension-reduced feature, content corresponding to the feature, so that the electronic device may obtain the first target content in the first target area. The preprocessing includes graying, binarization, noise reduction, tilt correction, and word segmentation. A process in which the electronic device preprocesses the first picture and performs feature extraction and feature dimension reduction on the preprocessed picture may be understood as a process in which the electronic device extracts content in the first picture.

It may be understood that, the possible implementation in which the electronic device receives the second operation performed on the first control and determines the first target content in the first target area may be set based on an actual application scenario. This is not limited in this embodiment of this application.

The electronic device and the stylus perform data transmission based on a Bluetooth protocol. Therefore, the electronic device cannot directly send the first target content to the stylus, but needs to encapsulate the first target content into content suitable for transmission in a Bluetooth module. Therefore, after determining the first target content, the electronic device needs to encapsulate the first target content. Therefore, the electronic device performs S704.

S704: The electronic device encapsulates the first target content, to obtain first encapsulation content.

In this embodiment of this application, the electronic device may encapsulate the first target content through a first encapsulation module, to obtain the first encapsulation content. A possible implementation in which the electronic device encapsulates the first target content to obtain the first encapsulation content is as follows: The electronic device obtains a first data type from a system configuration, the electronic device converts the first target content into content that matches the first data type, and the electronic device determines that the converted first target content is the first encapsulation content.

It may be understood that specific content of the first data type may be set based on an actual application scenario, which is not limited in this embodiment of this application. A specific implementation in which the electronic device encapsulates the first target content to obtain the first encapsulation content may also be set based on an actual application scenario, which is not limited in this embodiment of this application.

S705: The electronic device sends the first encapsulation content to the stylus.

In this embodiment of this application, the electronic device may send the first encapsulation content to the stylus through a first Bluetooth module. Adaptively, the stylus may receive the first encapsulation content from the electronic device through a second Bluetooth module. Further, the stylus performs S706.

It may be understood that when the electronic device sends the first encapsulation content to the stylus, the electronic device may also send the first data type to the stylus, so that the stylus may parse the first encapsulation content based on the first data type, that is, the stylus performs S706.

S706: The stylus parses the first encapsulation content, to obtain the first target content.

In this embodiment of this application, with reference to FIG. 6, the stylus may parse the first encapsulation content through a second parsing module. Because the stylus obtains the first data type from the electronic device, the stylus may parse the first encapsulation content based on the first data type, to obtain the first target content.

It may be understood that a specific implementation in which the electronic device parses the first encapsulation content, to obtain the first target content may also be set based on an actual application scenario, which is not limited in this embodiment of this application.

S707: The stylus obtains, based on information indicated by the first control, a first target result corresponding to the first target content.

In this embodiment of this application, the stylus is provided with an offline database, and a possible implementation in which the stylus obtains, based on the information indicated by the first control, the first target result corresponding to the first target content is as follows: The stylus calls the offline database, where the offline database stores a plurality of correspondences, and any one of the correspondences is used to indicate a relationship between target content and a target result; and when the stylus finds that the first target content matches any target content in the plurality of correspondences, the stylus obtains, from a correspondence in which the any target content is located, the first target result corresponding to the first target content.

When the stylus does not match the first target content in the plurality of correspondences, the stylus may call a cloud database; and the stylus queries the cloud database for a result corresponding to the first target content, to obtain the first target result.

When the first target content is text content, the information indicated by the first control is information indicating that the text content needs to be translated into a first language, and the first target result is a result indicating that the text content has been translated into the first language. The first language may be English or the like, and specific content of the first language may be set based on an actual application scenario. This is not limited in this embodiment of this application.

It should be noted that the stylus calls the cloud database in the following several possible implementations:

In a first possible implementation, the stylus and the electronic device establish wireless connections through respective Bluetooth modules. Therefore, when the electronic device is connected to a first network, the stylus may call the cloud database through the first network connected to the electronic device.

In a second possible implementation, the stylus may further include a Wi-Fi module. Therefore, after the user presses a first button on the stylus, the stylus receives an operation of pressing the first button, and the stylus may connect to a first hotspot through the Wi-Fi module and call the cloud database through a network of the first hotspot. The first hotspot is a hotspot provided by a first router, and the stylus and the first router can automatically perform security verification, so that efficiency of obtaining the first target result by the stylus can be improved.

In a third possible implementation, the stylus may further include a SIM card module, and the SIM card module may provide a second network for the stylus, so that the stylus may call the cloud database through a second network. The second network may be a cellular network. Therefore, the SIM card module may be understood as a module that provides a cellular network for the stylus.

It may be understood that, in the foregoing implementations, the stylus may call the cloud database through a network or a hotspot. Therefore, after the stylus obtains the first target result by using the cloud database, the stylus may update the offline database through the network or the hotspot. In this way, when the stylus obtains the first target result again based on the first target content, because the target content and the target result are already updated in the offline database, efficiency of obtaining the first target result by using the offline database can be improved.

It may be understood that the specific content of the first target content and specific content of the first target result corresponding to the first target content may be set based on an actual application scenario. This is not limited in this embodiment of this application.

With reference to FIG. 6, a micro controller unit (micro controller unit, MCU) processor of the stylus may call a data processing module, so that the stylus may call the offline database or the cloud database through the data processing module, to obtain the first target result corresponding to the first target content.

The electronic device and the stylus perform data transmission based on the Bluetooth protocol. Therefore, the stylus cannot directly send the first target result to the electronic device, but needs to encapsulate the first target result into content suitable for transmission in the Bluetooth module. Therefore, after obtaining the first target result, the stylus needs to encapsulate the first target result, that is, the stylus performs S708.

S708: The stylus encapsulates the first target result, to obtain second encapsulation content.

In this embodiment of this application, with reference to FIG. 6, the stylus may encapsulate the first target result through a second encapsulation module. For an implementation in which the stylus encapsulates the first target result, to obtain the second encapsulation content, refer to the content adaptation description of S704, and details are not described herein again.

S709: The stylus sends the second encapsulation content to the electronic device.

In this embodiment of this application, the stylus may send the second encapsulation content to the electronic device through the second Bluetooth module. Adaptively, the electronic device may receive the second encapsulation content from the stylus through the first Bluetooth module. Further, the electronic device performs S710.

S710: The electronic device parses the second encapsulation content, to obtain the first target result.

In this embodiment of this application, the electronic device may parse the second encapsulation content through a first parsing module, to obtain the first target result. For an implementation in which the electronic device parses the second encapsulation content, to obtain the first target result, refer to the content adaptation description of S706, and details are not described herein again.

S711: The electronic device displays the first target result on the first interface.

In this embodiment of this application, the electronic device parses, through the first parsing module, the second encapsulation content into the first target result suitable for display on the first interface. Therefore, after obtaining the first target result, the electronic device may display the first target result on the first interface through the display module, so that the user can see the first target result on the first interface.

Figure 10:
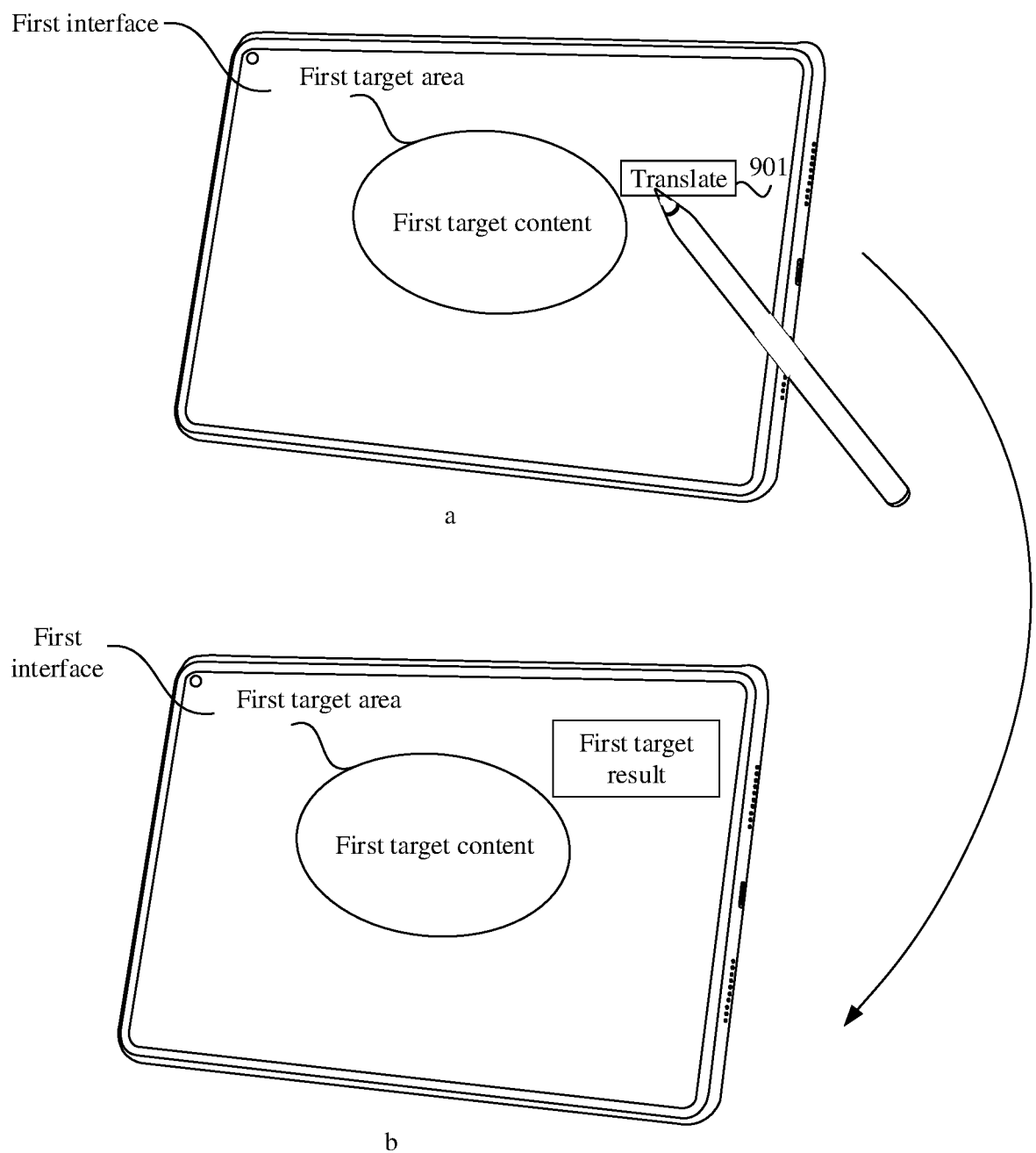
FIG. 10 is a schematic diagram of displaying a first target result according to an embodiment of this application.

Exemplarily, FIG. 10 is a schematic diagram of displaying the first target provided in this embodiment of this application. A schematic diagram a in FIG. 10 is a schematic diagram shown in FIG. 9. In the schematic diagram a in FIG. 10, after the user clicks translate 901 by using the stylus, with reference to the content described in S701 to S711, the first target content in the first target area may be translated based on the stylus, and a translation result of the first target content is displayed near the first target content, for example, in a schematic diagram b in FIG. 10, the first target result is displayed near the first target content in the first interface of the electronic device, where the first target result does not need to cover the first target content as much as possible, thereby facilitating comparison between the first target content and the first target result. It may be understood that the first target result may also be displayed in any area that supports text display on the first interface, and a specific position is not limited.

It may be understood that, before sending the first encapsulation content to the stylus, the electronic device may encrypt the first encapsulation content. In this way, when receiving the encrypted first encapsulation content, the stylus may first perform a decryption process and then parse the first encapsulation content to obtain the first target content. Similarly, before sending the second encapsulation content to the electronic device, the stylus may also encrypt the second encapsulation content. In this way, when receiving the encrypted second encapsulation content, the electronic device may first perform a decryption process and then parse the second encapsulation content to obtain the first target result. Therefore, reliability of data transmission between the electronic device and the stylus is improved.

It may be understood that the stylus may further be adapted to a voice play module. In this way, while the electronic device displays the first target result on the first interface, the stylus may play the first target result through the voice play module, thereby enriching a function of the stylus. Therefore, the stylus can implement translation of the first target content and can implement voice play of the first target result.

It should be noted that the content described in FIG. 7 to FIG. 10 are exemplary descriptions performed by using a translation control as an example. For example, the translation control is translate 901. The stylus may translate the first target content into the first language based on information indicated by the translation control, so that the electronic device may display, on the first interface, a result indicating that the first target content has been translated into the first language.

It may be understood that, after the user circles the first target area on the first interface by using the stylus, the first interface of the electronic device may alternatively display an answering control; or after the user circles the first target area on the first interface by using the stylus, the first interface of the electronic device may alternatively display both the translation control and the answering control. Based on a selection of a control by the user, the stylus may obtain, based on the information indicated by the first control, the first target result corresponding to the first target content, so that the first target result is displayed on the first interface.

For example, when the first target content is a question, the user may select the answering control on the first interface. In this way, the information indicated by the first control is information for answering the question, the stylus may obtain an answering process of the question based on the information indicated by the first control, and the electronic device may obtain the answering process, so that the answering process of the question can be displayed on the first interface.

It may be understood that a control displayed in the electronic device may be the translation control and/or the answering control described above, or may be a copy control. After the user clicks the copy control, the stylus may obtain content in a target area. In this way, after the user opens a search application of the electronic device, the user may use the stylus to copy the content in the target area into a search box in the search application, so that the user does not need to manually enter content in the search box, thereby improving efficiency of obtaining a target result by the user. The control displayed in the electronic device may alternatively be another type of control, which is not limited in this embodiment of this application.

With reference to the content described in FIG. 6 and FIG. 7, because the stylus includes a storage module, it may be understood that after the stylus obtains a target result corresponding to target content, the stylus may store the target content and the target result through the storage module, and record storage duration of the target content and the target result. The stored target content and target result may be used as pre-stored content, to facilitate the user to subsequently view the pre-stored content on the electronic device.

Figure 11A:
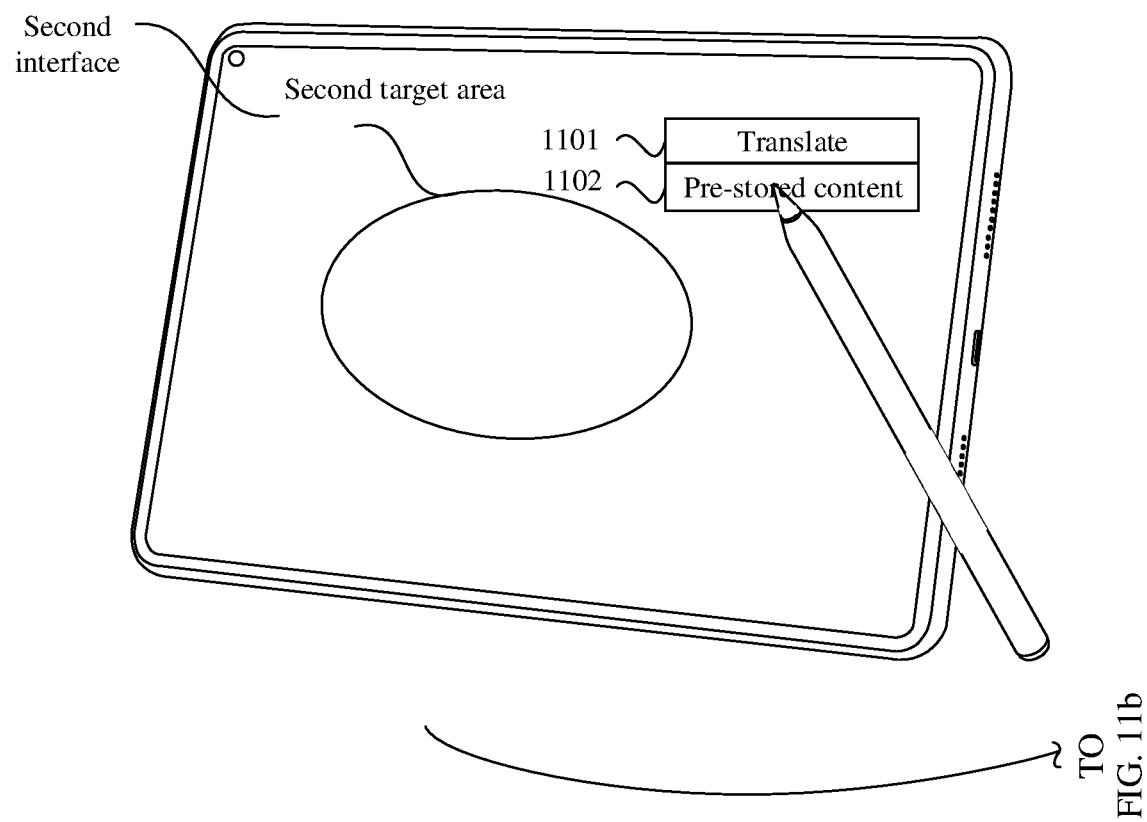
FIG. 11A to FIG. 11C are schematic diagrams of displaying pre-stored content according to an embodiment of this application.
Figure 11B:
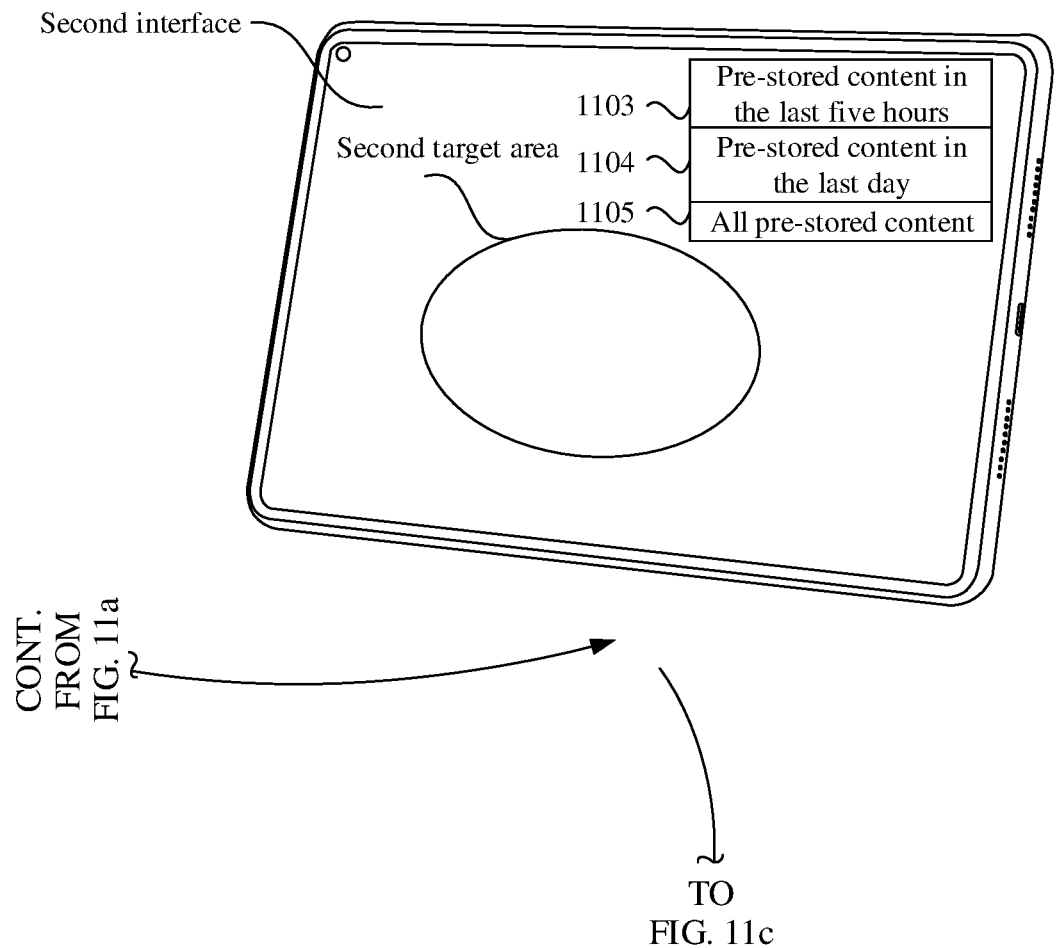
Figure 11C:
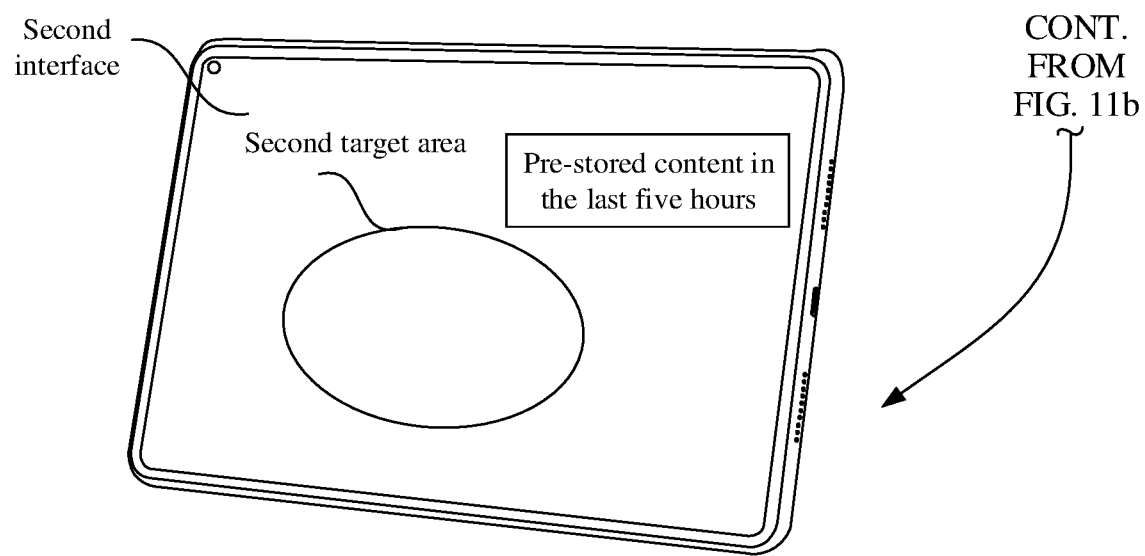

Exemplarily, FIG. 11A to FIG. 11C are schematic diagrams of displaying pre-stored content according to an embodiment of this application. In the schematic diagram of FIG. 11A, when a user circles a second target area on a second interface of an electronic device by using a stylus, the electronic device receives an operation of circling the second target area by the user. The second target area is some or all areas in the second interface. The second interface of the electronic device displays translate 1101 and pre-stored content 1102. After the user clicks the pre-stored content 1102, as shown in the schematic diagram of FIG. 11B, the second interface of the electronic device displays pre-stored content 1103 in the last five hours, pre-stored content 1104 in the last day, and all pre-stored content 1105. After the user clicks the pre-stored content 1103 in the last five hours, the electronic device may send information requesting the pre-stored content in the last five hours. Because the stylus records storage duration of target content and a target result, the stylus may collect, based on the storage duration, statistics about the pre-stored content in the last five hours stored in a storage module, and send the pre-stored content in the last five hours to the electronic device, so that the electronic device may display the pre-stored content in the last five hours on the second interface through the display module. As shown in the schematic diagram of FIG. 11C, the first interface displays the pre-stored content in the last five hours, or it is understood that the electronic device displays the target content and the target result in the last five hours on the first interface based on a current time. In this way, the user may perform a sliding operation on the pre-stored content in the last five hours, to select target content and a target result to be viewed.

The operation of circling the second target area by the user by using the stylus may be referred to as a third operation. The pre-stored content 1102 may be referred to as a second control. The operation of clicking the pre-stored content 1102 by the user is referred to as a fourth operation. The pre-stored content 1103 in the last five hours may be referred to as a third control. The third control is used to view target content and a target result in a first period of time. For example, the first period of time is five hours, and the operation of clicking the pre-stored content 1103 in the last five hours by the user by using the stylus is referred to as a fifth operation.

Specific content of the pre-stored content in the last five hours may be set based on an actual application scenario, which is not limited in this embodiment of this application. Periods of time for viewing pre-stored content may be set to five hours and 1 day in FIG. 11B, or may be other values. This is not specifically limited in this embodiment of this application.

Similarly, after the user clicks the pre-stored content 1104 in the last day by using the stylus, the second interface may display the pre-stored content in the last day, and the user may perform a sliding operation to select target content and a target result to be viewed in the pre-stored content in the last day. After the user clicks the all pre-stored content 1105 by using the stylus, the second interface may display all pre-stored content. The user may perform a sliding operation to select the target content and the target result to be viewed in all the pre-stored content. The pre-stored content may be displayed in any area that supports text display in the second interface, the area may cover the second target area, and a specific position is not limited.

It may be understood that, on the one hand, after the stylus is wirelessly connected to another electronic device, if the user circles an area in an interface of the another electronic device, with reference to the method shown in FIG. 11A to FIG. 11C, the another electronic device may obtain some or all pre-stored content from the storage module of the stylus, and display the some or all pre-stored content on the interface of the another electronic device. Alternatively, after the stylus is wirelessly connected to another electronic device, the another electronic device may obtain all pre-stored content from the storage module of the stylus, and store all the obtained pre-stored content locally. In this way, after the user circles the area on the interface of the another electronic device, with reference to the method shown in FIG. 11A to FIG. 11C, the another electronic device may directly read some or all the pre-stored content locally based on a selection of the user, thereby improving efficiency of displaying the pre-stored content. The user may select to display all the pre-stored content, the user may select to display the pre-stored content in the last five hours, or the user may select to display the pre-stored content in the last day, which is not limited in this embodiment of this application.

It may be understood that, on the other hand, after the stylus is wirelessly connected to another electronic device, the stylus may still obtain a target result corresponding to target content based on an interaction process with the another electronic device, so that the target result may be displayed on an interface of the another electronic device. For a specific process, refer to the method shown in FIG. 7.

The foregoing describes the stylus-based data processing method in embodiments of this application. The following describes an apparatus, provided in an embodiment of this application, for performing the stylus-based data processing method. A person skilled in the art may understand that the method and the apparatus may be mutually combined and referenced. A stylus-based data processing apparatus provided in an embodiment of this application may perform the steps in the stylus-based data processing method.

Figure 12:
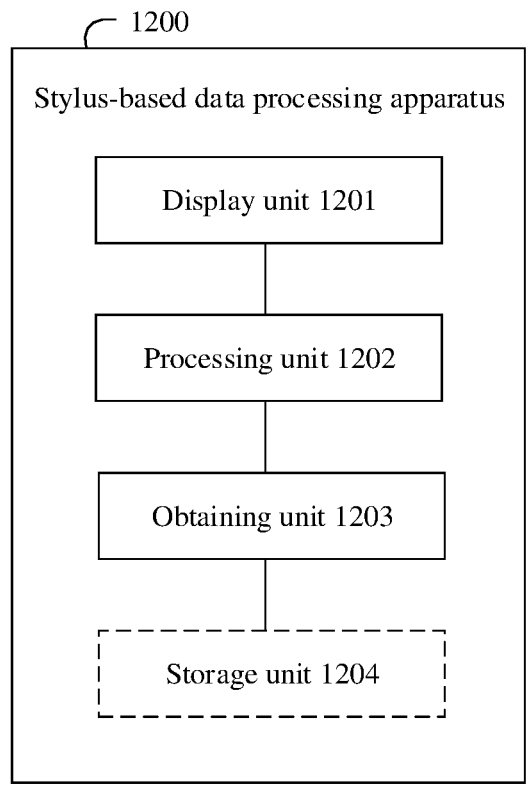
FIG. 12 is a schematic diagram of a structure of a stylus-based data processing apparatus according to an embodiment of this application.

Exemplarily, FIG. 12 is a schematic diagram of a stylus-based data processing apparatus according to an embodiment of this application. As shown in FIG. 12, the apparatus 1200 includes a display unit 1201, a processing unit 1202, and an obtaining unit 1203. The display unit 1201 is configured to support the stylus-based data processing apparatus to perform a display step, the processing unit 1202 is configured to support the stylus-based data processing apparatus to perform an information processing step, and the obtaining unit 1203 is configured to support the stylus-based data processing apparatus to perform an information obtaining step.

The display unit 1201 is configured to display a first interface; the processing unit 1202 is configured to receive, on the first interface, a first operation performed on a first target area by the stylus, where the first target area is some or all areas in the first interface; the display unit 1201 is further configured display a first control on the first interface in response to the first operation; the processing unit 1202 is further configured to receive a second operation performed on the first control; the processing unit 1202 is further configured to determine first target content in the first target area in response to the second operation; the obtaining unit 1203 is configured to obtain the first target content from the electronic device; the processing unit 1202 is configured to obtain, based on information indicated by the first control, a first target result corresponding to the first target content; the obtaining unit 1203 is further configured to obtain the first target result from the stylus; and the display unit 1201 is further configured to display the first target result on the first interface.

In a possible implementation, the stylus is provided with an offline database. The processing unit 1202 is specifically configured to: call the offline database, where the offline database stores a plurality of correspondences, and any one of the correspondences is used to indicate a relationship between target content and a target result; and when the stylus finds that the first target content matches any target content in the plurality of correspondences, obtain, from a correspondence in which the any target content is located, the first target result corresponding to the first target content.

In a possible implementation, the processing unit 1202 is further specifically configured to: when the stylus does not match the first target content in the plurality of correspondences, call a cloud database; and query the cloud database for a result corresponding to the first target content, to obtain the first target result.

In a possible implementation, the processing unit 1202 is specifically configured to: when the electronic device is connected to a first network, call the cloud database through the first network.

In a possible implementation, the processing unit 1202 is specifically configured to: connect to a first hotspot; and call the cloud database through a network of the first hotspot.

In a possible implementation, the processing unit 1202 is specifically configured to: connect to a second network; and call the cloud database through the second network.

In a possible implementation, when the first target content is text content, the information indicated by the first control is information indicating that the text content needs to be translated into a first language, and the first target result is a result indicating that the text content has been translated into the first language.

In a possible implementation, when the first target content is a question, the information indicated by the first control is information indicating that the question needs to be answered, and the first target result is a process of answering the question.

In a possible implementation, the obtaining unit 1203 is specifically configured to: receive first encapsulation content from the electronic device, where the first encapsulation content is content obtained after the electronic device encapsulates the first target content; and parse the first encapsulation content, to obtain the first target content.

In a possible implementation, the obtaining unit 1203 is specifically configured to: receive a second encapsulation content from the stylus, where the second encapsulation content is content obtained after the stylus encapsulates the first target result; and parse the second encapsulation content, to obtain the first target result.

In a possible implementation, the processing unit 1202 is specifically configured to: obtain a first picture corresponding to the first target area; and extract content in the first picture, to obtain the first target content.

In a possible implementation, the processing unit 1202 is further configured to receive, on a second interface, a third operation performed on a second target area by the stylus, where the second target area is some or all areas in the second interface; the display unit 1201 is further configured to display a second control on the second interface in response to the third operation; the processing unit 1202 is further configured to receive a fourth operation performed on the second control; the display unit 1201 is further configured to display a third control on the second interface in response to the fourth operation, where the third control is configured to view target content and a target result in a first period of time; the processing unit 1202 is further configured to receive a fifth operation performed on the third control; and the display unit 1201 is further configured to display the target content and the target result in the first period of time on the second interface in response to the fifth operation.

In a possible embodiment, the stylus-based data processing apparatus may further include a storage unit 1204. The display unit 1201, the processing unit 1202, the obtaining unit 1203, and the storage unit 1204 are connected by using a communication bus.

The storage unit 1204 may include one or more memories, and the memory may be one or more components that are in a device or a circuit and that are configured to store programs or data.

The storage unit 1204 may exist independently, and is connected to the obtaining unit 1203 of the stylus-based data processing apparatus by using the communication bus. The storage unit 1204 may alternatively be integrated with the obtaining unit 1203.

The stylus-based data processing apparatus may be used in a stylus-based data processing device, circuit, hardware component, or chip.

Figure 13:
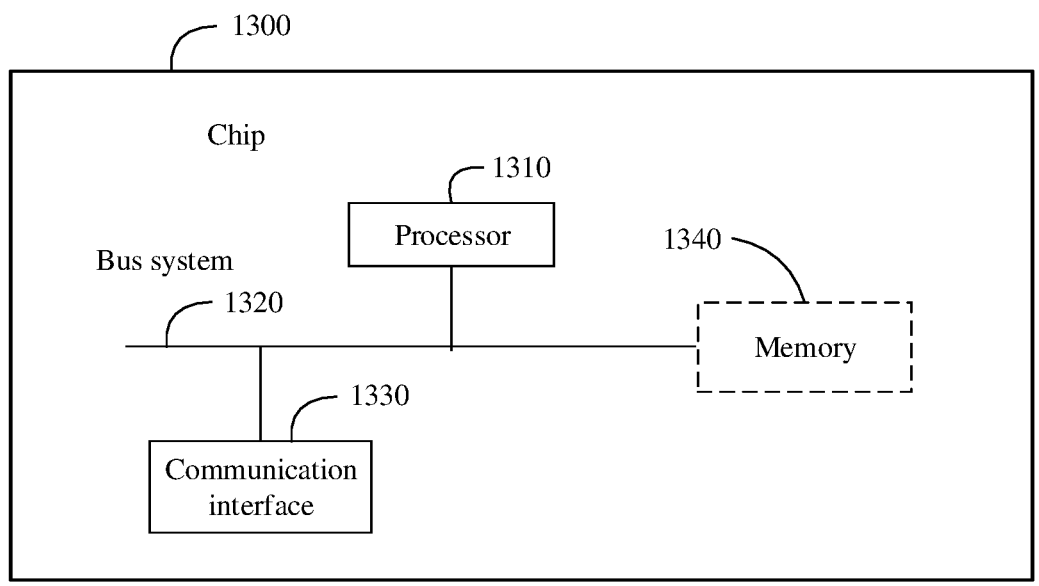
FIG. 13 is a schematic diagram of a structure of a chip according to an embodiment of this application.

Exemplarily, FIG. 13 is a schematic diagram of a structure of a chip according to an embodiment of this application. The chip 1300 includes one or at least two (including two) processors 1310 and a communication interface 1330.

In some implementations, a memory 1340 stores the following elements: an executable module or a data structure, a subset of an executable module or a data structure, or an extended set of an executable module or a data structure.

In this embodiment of this application, the memory 1340 may include a read-only memory and a random access memory, and provide instructions and data for the processor 1310. A part of the memory 1340 may further include a non-volatile random access memory (non-volatile random access memory, NVRAM).

In this embodiment of this application, the memory 1340, the communication interface 1330, and the memory 1340 are coupled together through a bus system 1320. In addition to a data bus, the bus system 1320 may further include a power bus, a control bus, a status signal bus, and the like. For ease of description, various buses are marked as the bus system 1320 in FIG. 13.

The foregoing method described in embodiments of this application may be applied to the processor 1310, or implemented by the processor 1310. The processor 1310 may be an integrated circuit chip, and has a signal processing capability. In an implementation process, the steps of the foregoing method may be completed by using an integrated logic circuit of hardware in the processor 1310 or an instruction in a form of software. The processor 1310 may be a general-purpose processor (for example, a microprocessor or a conventional processor), a digital signal processor (digital signal processing, DSP), an application-specific integrated circuit (application specific integrated circuit, ASIC), a field-programmable gate array (field-programmable gate array, FPGA) or another programmable logic device, a discrete gate, a transistor logic device, or a discrete hardware component. The processor 1310 may implement or perform the methods, steps, and logic block diagrams disclosed in embodiments of the present invention.

The steps of the method with reference to the embodiments of this application may be directly performed by a hardware decoding processor, or may be performed by using a combination of hardware and software modules in the decoding processor. The software module may be located in a mature storage medium in this field, for example, a random access memory, a read-only memory, a programmable read-only memory, or an electrically erasable programmable read only memory (electrically erasable programmable read only memory, EEPROM). The storage medium is located in the memory 1340. The processor 1310 reads information in the memory 1340 and completes the steps of the foregoing method with reference to the hardware of the processor.

In the foregoing embodiment, the instructions, stored in the memory and executed by the processor, may be implemented in a form of a computer program product. The computer program product may be written in the memory in advance, or may be downloaded and installed in the memory in a form of software.

The computer program product includes one or more computer instructions. When computer program instructions are loaded and executed on a computer, all or part of processes or functions are generated according to this embodiment of this application. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website site, computer, server, or data center to another website site, computer, server, or data center in a wired (for example, coaxial cable, optical fiber, or digital subscriber line (digital subscriber line, DSL)) or wireless (for example, infrared, wireless, or microwave) manner. The computer-readable storage medium may be any available medium that can be stored in the computer, or may be a data storage device, for example, a server or a data center that includes one or more available media. For example, the available medium may include a magnetic medium (for example, a floppy disk, a hard disk, or a magnetic tape), an optical medium (for example, a digital versatile disc (digital versatile disc, DVD)), or a semiconductor medium (for example, a solid state disk (solid state disk, SSD)).

An embodiment of this application further provides a computer-readable storage medium. The methods described in the foregoing embodiments may be implemented in whole or in part by using software, hardware, firmware, or any combination thereof. The computer-readable medium may include a computer storage medium and a communication medium, and may further include any medium that can transmit a computer program from one place to another. The storage medium may be any target medium that can be accessed by a computer.

In a possible design, a computer-readable medium may include a compact disc read-only memory (compact disc read-only memory, CD-ROM), a RAM, a ROM, an EEPROM, or another optical disk memory. The computer-readable medium may include a magnetic disk memory or another magnetic disk storage device. In addition, any connection cable may be appropriately referred to as a computer-readable medium. For example, if software is transmitted from a website, a server, or another remote source by using a coaxial cable, an optical fiber cable, a twisted pair, a DSL, or a wireless technology (for example, an infrared, radio, or microwave technology), the coaxial cable, the optical fiber cable, the twisted pair, the DSL, or the wireless technology, for example, an infrared, radio, or microwave technology, is included in a definition of the medium. As used herein, the magnetic disk and the optical disc include a compact disc (CD), a laser disc, an optical disc, a digital versatile disc (digital versatile disc, DVD), a floppy disk, and a blue-ray disc, where the magnetic disk usually reproduces data in a magnetic manner, and the optical disc reproduces data optically by using laser light.

A combination of the magnetic disk and the optical disc should also be included in the scope of the computer-readable medium. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A stylus-based data processing method, applied to a communication system, wherein the communication system comprises a stylus and an electronic device, and the method comprises:
   displaying, by the electronic device, a first interface;
   receiving, by the electronic device on the first interface, a first operation performed on a first target area by the stylus, wherein the first target area is some or all areas in the first interface;
   displaying, by the electronic device, a first control on the first interface in response to the first operation;
   receiving, by the electronic device, a second operation performed on the first control;
   determining, by the electronic device, first target content in the first target area in response to the second operation;
   obtaining, by the stylus, the first target content from the electronic device;
   obtaining, by the stylus based on information indicated by the first control, a first target result corresponding to the first target content;
   obtaining, by the electronic device, the first target result from the stylus; and
   displaying, by the electronic device, the first target result on the first interface;
   wherein the stylus stores an offline database, and obtaining, by the stylus based on the information indicated by the first control, the first target result corresponding to the first target content comprises:
   calling, by the stylus, the offline database, wherein the offline database comprises a plurality of correspondences, and any of the correspondences indicate a relationship between respective target content and a respective target result; and
   when the stylus finds that the first target content matches any target content in the plurality of correspondences, obtaining, by the stylus from a correspondence in which the any target content that matches the first target content is located, the first target result corresponding to the first target content.

2. The method according to claim 1, wherein the method further comprises:
   when the stylus does not match the first target content in the plurality of correspondences, calling, by the stylus, a cloud database; and
   querying, by the stylus, the cloud database for a result corresponding to the first target content, to obtain the first target result.

3. The method according to claim 2, wherein calling, by the stylus, the cloud database comprises:
when the electronic device is connected to a first network, calling, by the stylus, the cloud database through the first network.

4. The method according to claim 2, wherein calling, by the stylus, the cloud database comprises:
connecting the stylus to a first hotspot; and
calling, by the stylus, the cloud database through a network of the first hotspot.

5. The method according to claim 2, wherein calling, by the stylus, the cloud database comprises:
connecting the stylus to a second network; and
calling, by the stylus, the cloud database through the second network.

6. The method according to claim 3, wherein when the first target content is text content, the information indicated by the first control is information indicating to translate the text content into a first language, and the first target result is a result indicating that the text content has been translated into the first language.

7. The method according to claim 3, wherein when the first target content is a question, the information indicated by the first control is information indicating to answer the question, and the first target result is a process of answering the question.

8. The method according to claim 6, wherein obtaining, by the stylus, the first target content from the electronic device comprises:
receiving, by the stylus, first encapsulation content from the electronic device, wherein the first encapsulation content is content obtained after the electronic device encapsulates the first target content; and
parsing, by the stylus, the first encapsulation content, to obtain the first target content.

9. The method according to claim 8, wherein obtaining, by the electronic device, the first target result from the stylus comprises:
receiving, by the electronic device, second encapsulation content from the stylus, wherein the second encapsulation content is content obtained after the stylus encapsulates the first target result; and
parsing, by the electronic device, the second encapsulation content, to obtain the first target result.

10. The method according to claim 9, wherein determining, by the electronic device, the first target content in the first target area in response to the second operation comprises:
obtaining, by the electronic device, a first picture corresponding to the first target area; and
extracting, by the electronic device, content in the first picture, to obtain the first target content.

11. The method according to claim 10, wherein the method further comprises:
receiving, by the electronic device on a second interface, a third operation performed on a second target area by the stylus, wherein the second target area is some or all areas in the second interface;
displaying, by the electronic device, a second control on the second interface in response to the third operation;
receiving a fourth operation performed on the second control;
displaying, by the electronic device, a third control on the second interface in response to the fourth operation, wherein the third control is used to view target content and a target result in a first period of time;
receiving a fifth operation performed on the third control; and
displaying, by the electronic device, the target content and the target result in the first period of time on the second interface in response to the fifth operation.

12. A stylus-based data processing method, applied to a stylus, and the method comprises:
implementing, by the stylus, a first operation performed on a first target area of an electronic device, wherein the first target area is some or all areas in a first interface of the electronic device;
obtaining, by the stylus, a first target content of the first target area from the electronic device;
obtaining, by the stylus, a first target result corresponding to the first target content, and sending the first target result to the electronic device to cause the electronic device to display the first target result;
wherein the stylus stores an offline database, and obtaining, by the stylus the first target result corresponding to the first target content comprises:
calling, by the stylus, the offline database, wherein the offline database stores a plurality of correspondences, and any of the correspondences indicate a relationship between respective target content and a respective target result; and
when the stylus finds that the first target content matches any target content in the plurality of correspondences, obtaining, by the stylus from a correspondence in which the any target content matching the first target content is located, the first target result corresponding to the first target content; and
the method further comprises:
when the stylus does not match the first target content in the plurality of correspondences, calling, by the stylus, a cloud database; and
querying, by the stylus, the cloud database for a result corresponding to the first target content, to obtain the first target result.

13. The method according to claim 12, wherein calling, by the stylus, the cloud database comprises:
when the electronic device is connected to a first network, calling, by the stylus, the cloud database through the first network.

14. The method according to claim 12, wherein calling, by the stylus, the cloud database comprises:
connecting the stylus to a first hotspot; and
calling, by the stylus, the cloud database through a network of the first hotspot.

15. The method according to claim 12, wherein calling, by the stylus, the cloud database comprises:
connecting the stylus to a second network; and
calling, by the stylus, the cloud database through the second network.

16. The method according to claim 13, wherein when the first target content is text content, information indicated by a first control of the electronic device that is used to obtain the first target result is information indicating to translate the text content into a first language, and the first target result is a result indicating that the text content has been translated into the first language.

17. The method according to claim 13, wherein when the first target content is a question, information indicated by a first control of the electronic device that is used to obtain the first target result is information indicating to answer the question, and the first target result is a process of answering the question.

18. The method according to claim 17, wherein obtaining, by the stylus, the first target content from the electronic device comprises:

receiving, by the stylus, first encapsulation content from the electronic device, wherein the first encapsulation content is content obtained after the electronic device encapsulates the first target content; and parsing, by the stylus, the first encapsulation content, to obtain the first target content.

19. A non-transitory computer readable storage medium, wherein the non-transitory computer readable storage medium comprises a stored program, and when the program is running, a device in which the non-transitory computer readable storage medium is located is controlled to execute the following steps:

implementing, by a stylus, a first operation performed on a first target area of an electronic device, wherein the first target area is some or all areas in a first interface of the electronic device;

obtaining, by the stylus, a first target content of the first target area from the electronic device;

obtaining, by the stylus, a first target result corresponding to the first target content, and sending the first target result to the electronic device to cause the electronic device to display the first target result;

wherein the stylus stores an offline database, and obtaining, by the stylus, the first target result corresponding to the first target content comprises:

calling, by the stylus, the offline database, wherein the offline database comprises a plurality of correspondences, and any of the correspondences indicate a relationship between respective target content and a respective target result; and when the stylus finds that the first target content matches any target content in the plurality of correspondences, obtaining, by the stylus from a correspondence in which the any target content matching the first target content is located, the first target result corresponding to the first target content; and when the stylus does not match the first target content in the plurality of correspondences, calling, by the stylus, a cloud database; and querying, by the stylus, the cloud database for a result corresponding to the first target content, to obtain the first target result.

\* \* \* \* \*